(12) United States Patent
Acharya et al.

(10) Patent No.: US 12,216,663 B2
(45) Date of Patent: Feb. 4, 2025

(54) ADAPTIVE ONTOLOGY DRIVEN DIMENSIONS ACQUISITION, AUTOMATED SCHEMA CREATION, AND ENRICHED DATA IN TIME SERIES DATABASES

(71) Applicant: Honeywell International Inc., Charlotte, NC (US)

(72) Inventors: Bhabesh Chandra Acharya, Bangalore (IN); Prajosh Thaykandy, Bangalore (IN); Swaminath Balaji Akella, Bangalore (IN); Prithviraj Shivajirao Patil, Bangalore (IN); Gurender Singh, Bangalore (IN)

(73) Assignee: Honeywell International Inc., Charlotte, NC (US)

( * ) Notice: Subject to any disclaimer, the term of this patent is extended or adjusted under 35 U.S.C. 154(b) by 0 days.

(21) Appl. No.: 18/058,002

(22) Filed: Nov. 22, 2022

(65) Prior Publication Data
US 2023/0161777 A1    May 25, 2023

(30) Foreign Application Priority Data
Nov. 25, 2021   (IN) .............................. 202111054475

(51) Int. Cl.
| | |
|---|---|
| *G06F 16/2457* | (2019.01) |
| *G06F 16/21* | (2019.01) |
| *G06F 16/22* | (2019.01) |
| *G06F 16/28* | (2019.01) |

(52) U.S. Cl.
CPC .... *G06F 16/24575* (2019.01); *G06F 16/2246* (2019.01); *G06F 16/287* (2019.01); *G06F 16/211* (2019.01)

(58) Field of Classification Search
CPC ............ G06F 16/24575; G06F 16/287; G06F 16/2246; G06F 16/211
See application file for complete search history.

(56) References Cited

U.S. PATENT DOCUMENTS

| | | |
|---|---|---|
| 10,540,358 B2 | 1/2020 | Wu et al. |
| 11,144,042 B2 | 10/2021 | Thomsen et al. |
| 11,182,748 B1 | 11/2021 | Neckermann et al. |

(Continued)

OTHER PUBLICATIONS

Supplementary European search report Mailed on Mar. 27, 2023 for EP Application No. 22209334, 7 page(s).

(Continued)

*Primary Examiner* — Kannan Shanmugasundaram
(74) *Attorney, Agent, or Firm* — Alston & Bird LLP

(57) ABSTRACT

Various embodiments described herein relate to a contextualized time series database and/or contextualized time series data consumption. In this regard, a request to generate contextualized time series data related to one or more assets is received. The request includes a user identifier indicating an identity of a user associated with the request. In response to the request, telemetry data associated with the one or more assets is contextualized, based on metadata and a set of data dimensionality filters associated with the user identifier, to generate the contextualized time series data. Furthermore, the contextualized time series data is allocated within a datastore configured for the user identifier to facilitate obtaining one or more insights with respect to the contextualized time series data.

21 Claims, 14 Drawing Sheets

(56) References Cited

U.S. PATENT DOCUMENTS

| | | | |
|---|---|---|---|
| 2010/0100456 A1* | 4/2010 | West | G06Q 30/0601 |
| | | | 705/26.1 |
| 2011/0071365 A1 | 3/2011 | Lee et al. | |
| 2016/0370338 A1 | 12/2016 | Sayfan | |
| 2017/0262446 A1 | 9/2017 | McLaughlin | |
| 2017/0364561 A1* | 12/2017 | Wu | G06F 16/2456 |
| 2018/0253344 A1 | 9/2018 | Deligia et al. | |
| 2019/0064787 A1 | 2/2019 | Maturana | |
| 2019/0340290 A1 | 11/2019 | Dang et al. | |
| 2020/0210647 A1 | 7/2020 | Panuganty et al. | |
| 2020/0295879 A1 | 9/2020 | Jas | |
| 2021/0019063 A1* | 1/2021 | Lee | G06F 11/108 |
| 2021/0211471 A1 | 7/2021 | Crabtree et al. | |
| 2021/0337014 A1 | 10/2021 | Cameron | |
| 2022/0327538 A1 | 10/2022 | Kumar et al. | |
| 2022/0374402 A1 | 11/2022 | Hawkins et al. | |
| 2023/0401191 A1 | 12/2023 | Conradi et al. | |

OTHER PUBLICATIONS

EP Office Action Mailed on Dec. 12, 2023 for EP Application No. 22209334, 5 page(s).

Department of Energy, Internet of Things-enabled Devices and the Grid, Jun. 1, 2017 (accessed Feb. 24, 2024 at https://www.energy.gov/articles/internet-things-enabled-devices-and-grid) (Year: 2017).

Electric Power Group, *LLC* v. *Alstom SA*, 830 F. 3d 1350 (Fed. Cir. 2016) (Year: 2016).

Examiner Interview Summary Record (PTOL-413) Mailed on Feb. 14, 2024 for U.S. Appl. No. 17/748,417, 2 page(s).

Final Rejection Mailed on Jun. 18, 2024 for U.S. Appl. No. 17/748,417, 23 page(s).

Final Rejection Mailed on Nov. 9, 2023 for U.S. Appl. No. 17/748,417, 20 page(s).

*Google LLC* v. *Oracle America, Inc.*, 593 U.S. , 141 S. Ct. 1183 (2021) (Year: 2021).

Non-Final Rejection Mailed on Feb. 29, 2024 for U.S. Appl. No. 17/748,417, 21 page(s).

Non-Final Rejection Mailed on Jun. 8, 2023 for U.S. Appl. No. 17/748,417, 23 page(s).

Office Action Appendix Mailed on Feb. 14, 2024 for U.S. Appl. No. 17/748,417, 1 page(s).

Non-Final Rejection Mailed on Nov. 13, 2024 for U.S. Appl. No. 17/748,417, 29 page(s).

Non-Final Rejection Mailed on Dec. 12, 2024 for U.S. Appl. No. 18/320,548, 43 page(s).

* cited by examiner

ADAPTIVE ONTOLOGY DRIVEN DIMENSIONS ACQUISITION, AUTOMATED SCHEMA CREATION, AND ENRICHED DATA IN TIME SERIES DATABASES

CROSS REFERENCE TO RELATED APPLICATIONS

This application claims the benefit of India Patent Application No. 202111054475, titled "ADAPTIVE ONTOLOGY DRIVEN DIMENSIONS ACQUISITION, AUTOMATED SCHEMA CREATION, AND ENRICHED DATA IN TIME SERIES DATABASES," and filed on Nov. 25, 2021, the entirety of which is hereby incorporated by reference.

TECHNICAL FIELD

The present disclosure relates generally to real-time asset analytics, and more particularly to a contextualized time series database and/or contextualized time series data consumption.

BACKGROUND

Traditionally, a majority amount of time (e.g., 60%-80% of time) related to data analytics and/or digital transformation of data involves cleaning and/or preparing the data for analysis. Furthermore, a limited amount of time is traditionally spent on modeling of the data to, for example, provide insights related to the data. As such, computing resources related to data analytics and/or digital transformation of data are traditionally employed in an inefficient manner.

SUMMARY

The details of some embodiments of the subject matter described in this specification are set forth in the accompanying drawings and the description below. Other features, aspects, and advantages of the subject matter will become apparent from the description, the drawings, and the claims.

In an embodiment, a system comprises one or more processors, a memory, and one or more programs stored in the memory. In one or more embodiments, the one or more programs comprise instructions configured to receive, via a user-interactive electronic interface, an application programming interface (API) command request to generate contextualized time series data related to one or more assets. In one or more embodiments, the API command request comprises a user identifier indicating an identity of a user associated with the API command request. In one or more embodiments, in response to the API command request, the one or more programs further comprise instructions configured to contextualize, based on metadata and a set of data dimensionality filters associated with the user identifier, telemetry data associated with the one or more assets to generate the contextualized time series data. In one or more embodiments, in response to the API command request, the one or more programs further comprise instructions configured to allocate the contextualized time series data within a datastore configured for the user identifier. In one or more embodiments, in response to the API command request, the one or more programs further comprise instructions configured to obtain one or more insights with respect to the contextualized time series data allocated within the datastore associated with the user identifier. In one or more embodiments, in response to the API command request, the one or more programs further comprise instructions configured to render a visual representation of the one or more insights via the user-interactive electronic interface.

In another embodiment, a method is provided. In one or more embodiments, the method comprises receiving, via a user-interactive electronic interface, an API command request to generate contextualized time series data related to one or more assets. In one or more embodiments, the API command request comprises a user identifier indicating an identity of a user associated with the API command request. In one or more embodiments, in response to the API command request, the method comprises contextualizing, based on metadata and a set of data dimensionality filters associated with the user identifier, telemetry data associated with the one or more assets to generate the contextualized time series data. In one or more embodiments, in response to the API command request, the method comprises allocating the contextualized time series data within a datastore configured for the user identifier. In one or more embodiments, in response to the API command request, the method comprises obtaining one or more insights with respect to the contextualized time series data allocated within the datastore associated with the user identifier. In one or more embodiments, in response to the API command request, the method comprises rendering a visual representation of the one or more insights via the user-interactive electronic interface.

In yet another embodiment, a computer program product comprises at least one computer-readable storage medium having program instructions embodied thereon. In one or more embodiments, the program instructions are executable by a processor to cause the processor to receive, via a user-interactive electronic interface, an API command request to generate contextualized time series data related to one or more assets. In one or more embodiments, the API command request comprises a user identifier indicating an identity of a user associated with the API command request. In one or more embodiments, in response to the API command request, the program instructions further cause the processor to contextualize, based on metadata and a set of data dimensionality filters associated with the user identifier, telemetry data associated with the one or more assets to generate the contextualized time series data. In one or more embodiments, in response to the API command request, the program instructions further cause the processor to allocate the contextualized time series data within a datastore configured for the user identifier. In one or more embodiments, in response to the API command request, the program instructions further cause the processor to obtain one or more insights with respect to the contextualized time series data allocated within the datastore associated with the user identifier. In one or more embodiments, in response to the API command request, the program instructions further cause the processor to render a visual representation of the one or more insights via the user-interactive electronic interface.

BRIEF DESCRIPTION OF THE DRAWINGS

The description of the illustrative embodiments can be read in conjunction with the accompanying figures. It will be appreciated that for simplicity and clarity of illustration, elements illustrated in the figures have not necessarily been drawn to scale. For example, the dimensions of some of the elements are exaggerated relative to other elements. Embodiments incorporating teachings of the present disclosure are shown and described with respect to the figures presented herein, in which.

DETAILED DESCRIPTION

Figure 1:
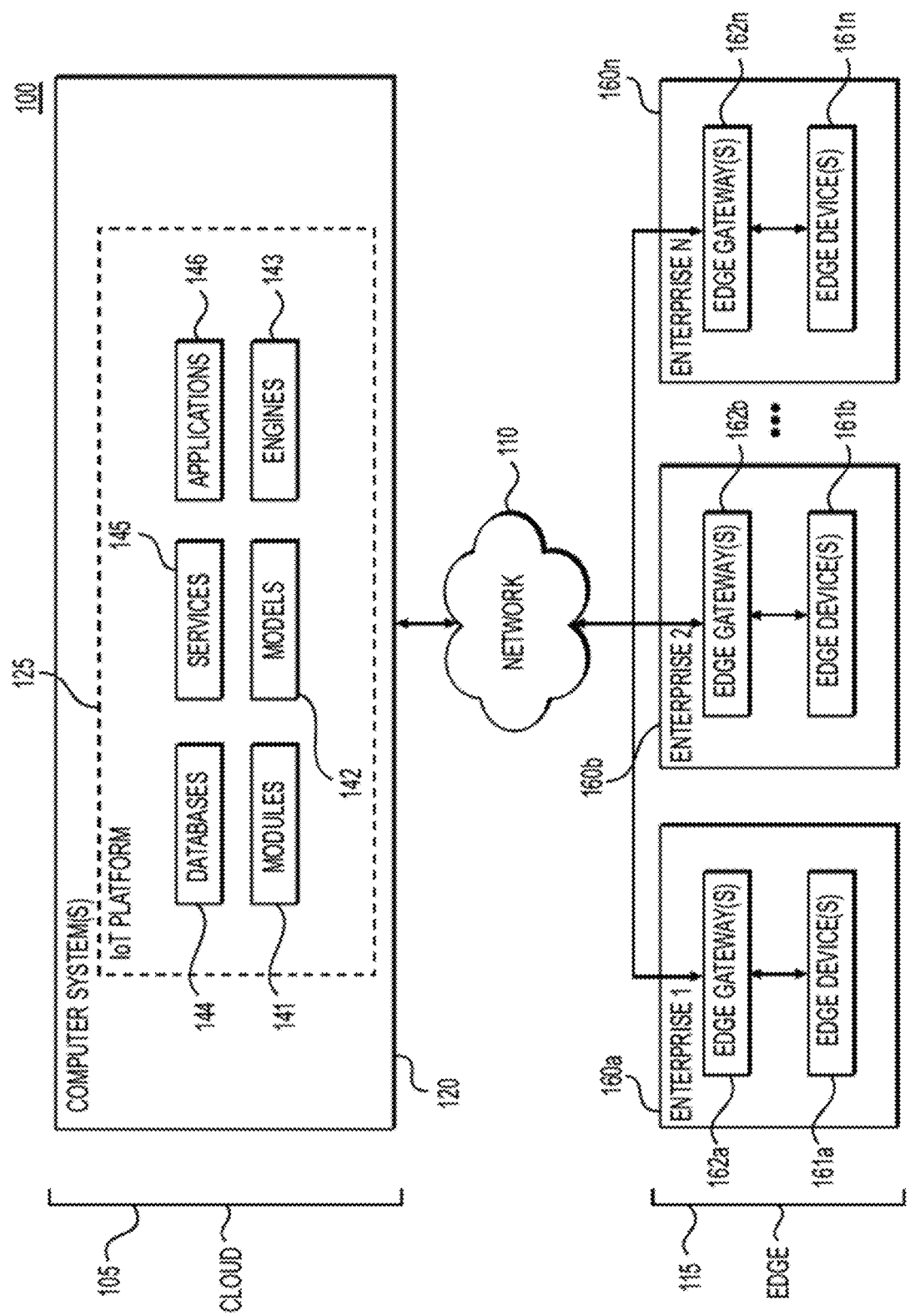
FIG. 1 illustrates an exemplary networked computing system environment, in accordance with one or more embodiments described herein.

Reference will now be made in detail to embodiments, examples of which are illustrated in the accompanying drawings. In the following detailed description, numerous specific details are set forth in order to provide a thorough understanding of the various described embodiments. However, it will be apparent to one of ordinary skill in the art that the various described embodiments may be practiced without these specific details. In other instances, well-known methods, procedures, components, circuits, and networks have not been described in detail so as not to unnecessarily obscure aspects of the embodiments. The term "or" is used herein in both the alternative and conjunctive sense, unless otherwise indicated. The terms "illustrative," "example," and "exemplary" are used to be examples with no indication of quality level. Like numbers refer to like elements throughout.

The phrases "in an embodiment," "in one embodiment," "according to one embodiment," and the like generally mean that the particular feature, structure, or characteristic following the phrase can be included in at least one embodiment of the present disclosure, and can be included in more than one embodiment of the present disclosure (importantly, such phrases do not necessarily refer to the same embodiment).

The word "exemplary" is used herein to mean "serving as an example, instance, or illustration." Any implementation described herein as "exemplary" is not necessarily to be construed as preferred or advantageous over other implementations.

If the specification states a component or feature "can," "may," "could," "should," "would," "preferably," "possibly," "typically," "optionally," "for example," "often," or "might" (or other such language) be included or have a characteristic, that particular component or feature is not required to be included or to have the characteristic. Such component or feature can be optionally included in some embodiments, or it can be excluded.

In general, the present disclosure provides for an "Internet-of-Things" or "IoT" platform for enterprise performance management that uses real-time accurate models and visual analytics to deliver intelligent actionable recommendations for sustained peak performance of an enterprise or organization. The IoT platform is an extensible platform that is portable for deployment in any cloud or data center environment for providing an enterprise-wide, top to bottom view, displaying the status of processes, assets, people, and safety. Further, the IoT platform of the present disclosure supports end-to-end capability to execute models against process data and to translate the output into actionable insights, as detailed in the following description.

Traditionally, a majority amount of time (e.g., 60%-80% of time) related to data analytics and/or digital transformation of data involves cleaning and/or preparing the data for analysis. Furthermore, a limited amount of time is traditionally spent on modeling of the data to, for example, provide insights related to the data. As such, computing resources related to data analytics and/or digital transformation of data are traditionally employed in an inefficient manner.

As an example, it is generally difficult to model and/or consume internet of things (IoT) data provided directly from IoT devices. Generally, unstructured IoT data is retrieved from a database to attempt to provide insights with respect IoT data. However, this generally results in decreased processing performance for a computing system and/or increased utilization of computing resources for a computing system.

Thus, to address these and/or other issues, a contextualized time series database and/or contextualized time series data consumption is provided. According to various embodiments, adaptive ontology driven dimensions acquisition of telemetry data, automated tenant specific schema creation for parsing data in a contextualized time series database, and/or enriched data generation for the contextualized time series database is provided. Various embodiments described herein provide value to IoT data (e.g., telemetry data) such that IoT data is contextualized in relation to a user ecosystem. According to various embodiments, IoT data is contextualized and/or enriched to facilitate generation of a contextualized time series database and/or contextualized time series data consumption. According to various embodiments, contextualized IoT data provides spatial-based context and/or time-based context for the IoT data. According to various embodiments, contextualized IoT data is consumed directly from a single application programing interface (API) source. According to various embodiments, contextualized IoT data is scaled and/or stored as tagged enriched data for an extensible object model to facilitate generation of a contextualized time series database and/or contextualized time series data consumption. According to various embodiments, the extensible object model is a domain-intensive semantic object model. According to various embodiments, the contextualized time series database and/or the contextualized time series data consumption provides decreased utilization of computing resources for a computing system and/or increased performance for a computing system.

In various embodiments, data from one or more data sources is ingested, cleaned, aggregated and/or contextualized to provide contextualized time series data (e.g., spatial contextual information). In various embodiments, a data pipeline architecture acquires metadata from a hierarchical database and/or acquires streaming data from message queues related to industrial assets. Additionally, in various embodiments, the data pipeline architecture processes, parses and/or contextualizes the streaming data using the metadata to facilitate storage of the streaming data in a contextualized time series database. In various embodiments, data from one or more data sources is ingested, cleaned, aggregated and/or contextualized based on dimensionality information and/or filters that are employed to acquire the data from columns and/or properties related to incoming data. In various embodiments, the filters are configured for respective user identifiers, respective events, respective alarms, and/or a type of data source for storage of the data. In various embodiments, data from one or more data sources is ingested, cleaned, aggregated and/or contextualized based on metadata related to a functional role of a user identifier, an event identifier, an alarm identifier, spatial dimensionality of the data and/or a contextualized time series database, asset information related to data, algorithm parameters related to contextualization of data into a contextualized time series database, and/or other types of metadata. In various embodiments, an insert, update, delete pipeline is employed to manage data stored in a contextualized time series database. In various embodiments, a type of operation to perform with respect to data is determined based on header data for a data packet associated with the data. In various embodiments, a timestamp is correlated with an insert operation, an update operation, and/or a delete operation with respect to data associated with a contextualized time series database.

In various embodiments, one or more insights are determined from the contextualized time series data to provide cost savings and/or efficiency insights. In one or more embodiments, data is retrieved from one or more data sources and the data is unified in a contextualized time series database. In one or more embodiments, the contextualized time series database is updated at one or more predetermined intervals to keep data in the contextualized time series database up to date. According to one or more embodiments, the contextualized time series data in the contextualized time series database is made uniform by recognizing different attributes associated with the contextualized time series data. In one or more embodiments, the contextualized time series data in the contextualized time series database is organized in an ontological structure. In one or more embodiments, the ontological structure allows complex structures to be understood (e.g., "which building have uncomfortable temperature higher than 22 degrees Celsius," "which zone has a temperature higher than 22 degrees Celsius," "what is the unit of measure at this point," "what is the average temperature in building ABC," etc.).

As such, by employing one or more techniques disclosed herein, asset performance is optimized. Moreover, by employing one or more techniques disclosed herein, improved insights for one or more assets can be provided to a user via improved visual indicators associated with a graphical user interface. For instance, by employing one or more techniques disclosed herein, additional and/or improved insights as compared to capabilities of conventional techniques can be achieved across a data set. Additionally, performance of a processing system associated with data analytics is improved by employing one or more techniques disclosed herein. For example, a number of computing resources, a number of a storage requirements, and/or number of errors associated with data analytics is reduced by employing one or more techniques disclosed herein.

FIG. 1 illustrates an exemplary networked computing system environment 100, according to the present disclosure. As shown in FIG. 1, networked computing system environment 100 is organized into a plurality of layers including a cloud 105 (e.g., a cloud layer 105), a network 110 (e.g., a network layer 110), and an edge 115 (e.g., an edge layer 115). As detailed further below, components of the edge 115 are in communication with components of the cloud 105 via network 110.

In various embodiments, network 110 is any suitable network or combination of networks and supports any appropriate protocol suitable for communication of data to and from components of the cloud 105 and between various other components in the networked computing system environment 100 (e.g., components of the edge 115). According to various embodiments, network 110 includes a public network (e.g., the Internet), a private network (e.g., a network within an organization), or a combination of public and/or private networks. According to various embodiments, network 110 is configured to provide communication between various components depicted in FIG. 1. According to various embodiments, network 110 comprises one or more networks that connect devices and/or components in the network layout to allow communication between the devices and/or components. For example, in one or more embodiments, the network 110 is implemented as the Internet, a wireless network, a wired network (e.g., Ethernet), a local area network (LAN), a Wide Area Network (WANs), Bluetooth, Near Field Communication (NFC), or any other type of network that provides communications between one or more components of the network layout. In some embodiments, network 110 is implemented using cellular networks, satellite, licensed radio, or a combination of cellular, satellite, licensed radio, and/or unlicensed radio networks.

Components of the cloud 105 include one or more computer systems 120 that form a so-called "Internet-of-Things" or "IoT" platform 125. It should be appreciated that "IoT platform" is an optional term describing a platform connecting any type of Internet-connected device, and should not be construed as limiting on the types of computing systems useable within IoT platform 125. In particular, in various embodiments, computer systems 120 includes any type or quantity of one or more processors and one or more data storage devices comprising memory for storing and executing applications or software modules of networked computing system environment 100. In one embodiment, the processors and data storage devices are embodied in server-class hardware, such as enterprise-level servers. For example, in an embodiment, the processors and data storage devices comprise any type or combination of application servers, communication servers, web servers, super-computing servers, database servers, file servers, mail servers, proxy servers, and/virtual servers. Further, the one or more processors are configured to access the memory and execute processor-readable instructions, which when executed by the processors configures the processors to perform a plurality of functions of the networked computing system environment 100.

Computer systems 120 further include one or more software components of the IoT platform 125. For example, in one or more embodiments, the software components of computer systems 120 include one or more software modules to communicate with user devices and/or other computing devices through network 110. For example, in one or more embodiments, the software components include one or more modules 141, models 142, engines 143, databases 144, services 145, and/or applications 146, which may be stored in/by the computer systems 120 (e.g., stored on the memory), as detailed with respect to FIG. 2 below. According to various embodiments, the one or more processors are configured to utilize the one or more modules 141, models 142, engines 143, databases 144, services 145, and/or applications 146 when performing various methods described in this disclosure.

Accordingly, in one or more embodiments, computer systems 120 execute a cloud computing platform (e.g., IoT platform 125) with scalable resources for computation and/or data storage, and may run one or more applications on the cloud computing platform to perform various computer-implemented methods described in this disclosure. In some embodiments, some of the modules 141, models 142, engines 143, databases 144, services 145, and/or applications 146 are combined to form fewer modules, models, engines, databases, services, and/or applications. In some embodiments, some of the modules 141, models 142, engines 143, databases 144, services 145, and/or applications 146 are separated into separate, more numerous modules, models, engines, databases, services, and/or applications. In some embodiments, some of the modules 141, models 142, engines 143, databases 144, services 145, and/or applications 146 are removed while others are added.

The computer systems 120 are configured to receive data from other components (e.g., components of the edge 115) of networked computing system environment 100 via network 110. Computer systems 120 are further configured to utilize the received data to produce a result. According to various embodiments, information indicating the result is transmitted to users via user computing devices over network 110. In some embodiments, the computer systems 120 is a server system that provides one or more services including providing the information indicating the received data and/or the result(s) to the users. According to various embodiments, computer systems 120 are part of an entity which include any type of company, organization, or institution that implements one or more IoT services. In some examples, the entity is an IoT platform provider.

Components of the edge 115 include one or more enterprises 160a-160n each including one or more edge devices 161a-161n and one or more edge gateways 162a-162n. For example, a first enterprise 160a includes first edge devices 161a and first edge gateways 162a, a second enterprise 160b includes second edge devices 161b and second edge gateways 162b, and an nth enterprise 160n includes nth edge devices 161n and nth edge gateways 162n. As used herein, enterprises 160a-160n represent any type of entity, facility, or vehicle, such as, for example, companies, divisions, buildings, manufacturing plants, warehouses, real estate facilities, laboratories, aircraft, spacecraft, automobiles, ships, boats, military vehicles, oil and gas facilities, or any other type of entity, facility, and/or entity that includes any number of local devices.

Figure 2:
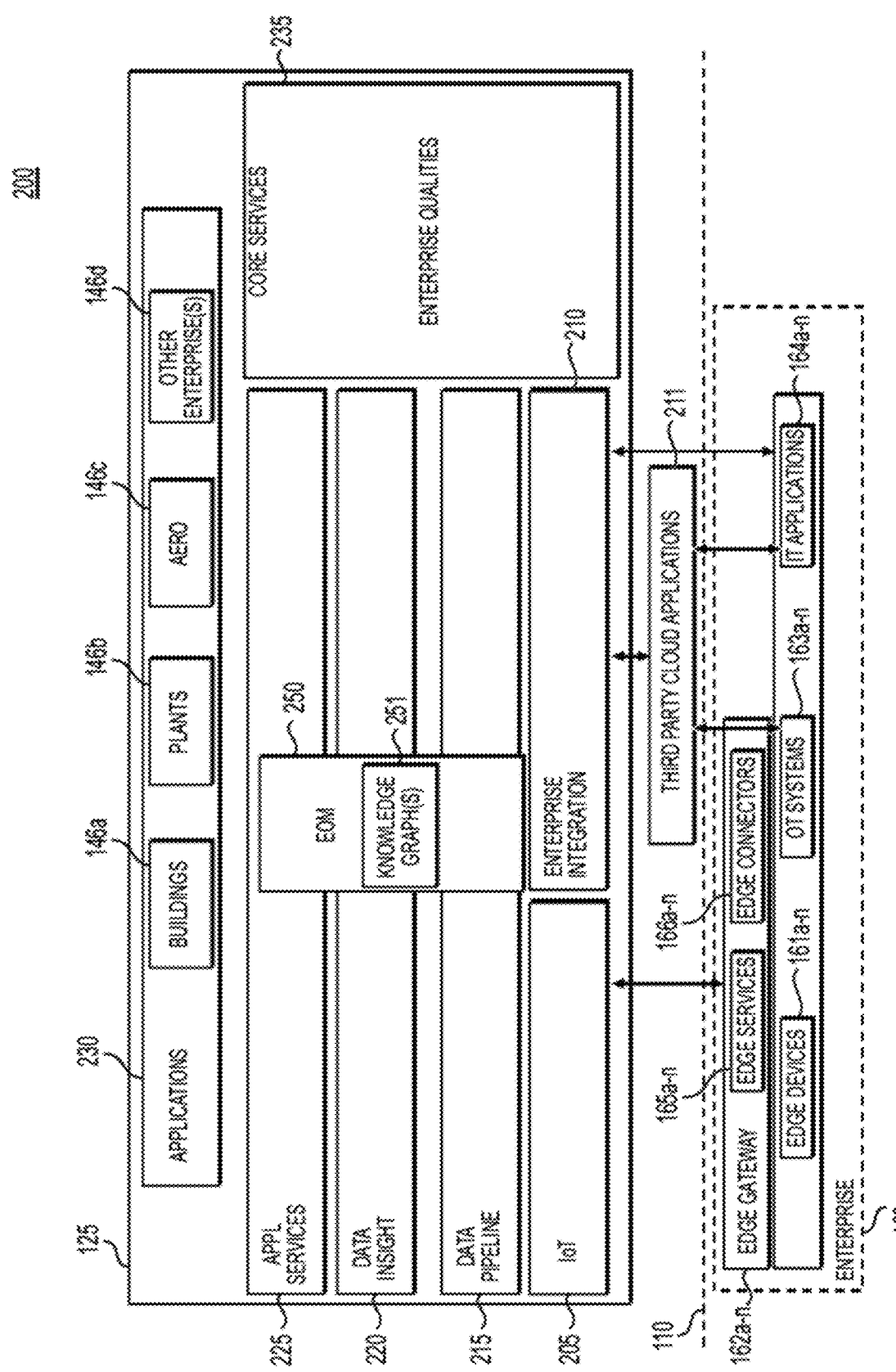
FIG. 2 illustrates a schematic block diagram of a framework of an IoT platform of the networked computing system, in accordance with one or more embodiments described herein.

According to various embodiments, the edge devices 161a-161n represent any of a variety of different types of devices that may be found within the enterprises 160a-160n. Edge devices 161a-161n are any type of device configured to access network 110, or be accessed by other devices through network 110, such as via an edge gateway 162a-162n. According to various embodiments, edge devices 161a-161n are "IoT devices" which include any type of network-connected (e.g., Internet-connected) device. For example, in one or more embodiments, the edge devices 161a-161n include assets, sensors, actuators, processors, computers, valves, pumps, ducts, vehicle components, cameras, displays, doors, windows, security components, boilers, chillers, pumps, air handler units, HVAC components, factory equipment, and/or any other devices that are connected to the network 110 for collecting, sending, and/or receiving information. Each edge device 161a-161n includes, or is otherwise in communication with, one or more controllers for selectively controlling a respective edge device 161a-161n and/or for sending/receiving information between the edge devices 161a-161n and the cloud 105 via network 110. With reference to FIG. 2, in one or more embodiments, the edge 115 include operational technology (OT) systems 163a-163n and information technology (IT) applications 164a-164n of each enterprise 161a-161n. The OT systems 163a-163n include hardware and software for detecting and/or causing a change, through the direct monitoring and/or control of industrial equipment (e.g., edge devices 161a-161n), assets, processes, and/or events. The IT applications 164a-164n includes network, storage, and computing resources for the generation, management, storage, and delivery of data throughout and between organizations.

The edge gateways 162a-162n include devices for facilitating communication between the edge devices 161a-161n and the cloud 105 via network 110. For example, the edge gateways 162a-162n include one or more communication interfaces for communicating with the edge devices 161a-161n and for communicating with the cloud 105 via network 110. According to various embodiments, the communication interfaces of the edge gateways 162a-162n include one or more cellular radios, Bluetooth, WiFi, near-field communication radios, Ethernet, or other appropriate communication devices for transmitting and receiving information. According to various embodiments, multiple communication interfaces are included in each gateway 162a-162n for providing multiple forms of communication between the edge devices 161a-161n, the gateways 162a-162n, and the cloud 105 via network 110. For example, in one or more embodiments, communication are achieved with the edge devices 161a-161n and/or the network 110 through wireless communication (e.g., WiFi, radio communication, etc.) and/or a wired data connection (e.g., a universal serial bus, an onboard diagnostic system, etc.) or other communication modes, such as a local area network (LAN), wide area network (WAN) such as the Internet, a telecommunications network, a data network, or any other type of network.

According to various embodiments, the edge gateways 162a-162n also include a processor and memory for storing and executing program instructions to facilitate data processing. For example, in one or more embodiments, the edge gateways 162a-162n are configured to receive data from the edge devices 161a-161n and process the data prior to sending the data to the cloud 105. Accordingly, in one or more embodiments, the edge gateways 162a-162n include one or more software modules or components for providing data processing services and/or other services or methods of the present disclosure. With reference to FIG. 2, each edge gateway 162a-162n includes edge services 165a-165n and edge connectors 166a-166n. According to various embodiments, the edge services 165a-165n include hardware and software components for processing the data from the edge devices 161a-161n. According to various embodiments, the edge connectors 166a-166n include hardware and software components for facilitating communication between the edge gateway 162a-162n and the cloud 105 via network 110, as detailed above. In some cases, any of edge devices 161a-n, edge connectors 166a-n, and edge gateways 162a-n have their functionality combined, omitted, or separated into any combination of devices. In other words, an edge device and its connector and gateway need not necessarily be discrete devices.

FIG. 2 illustrates a schematic block diagram of framework 200 of the IoT platform 125, according to the present disclosure. The IoT platform 125 of the present disclosure is a platform for enterprise performance management that uses real-time accurate models and visual analytics to deliver intelligent actionable recommendations and/or analytics for sustained peak performance of the enterprise 160a-160n. The IoT platform 125 is an extensible platform that is portable for deployment in any cloud or data center environment for providing an enterprise-wide, top to bottom view, displaying the status of processes, assets, people, and safety. Further, the IoT platform 125 supports end-to-end capability to execute digital twins against process data and to translate the output into actionable insights, using the framework 200, detailed further below.

As shown in FIG. 2, the framework 200 of the IoT platform 125 comprises a number of layers including, for example, an IoT layer 205, an enterprise integration layer 210, a data pipeline layer 215, a data insight layer 220, an application services layer 225, and an applications layer 230. The IoT platform 125 also includes a core services layer 235 and an extensible object model (EOM) 250 comprising one or more knowledge graphs 251. The layers 205-235 further include various software components that together form each layer 205-235. For example, in one or more embodiments, each layer 205-235 includes one or more of the modules 141, models 142, engines 143, databases 144, services 145, applications 146, or combinations thereof. In some embodiments, the layers 205-235 are combined to form fewer layers. In some embodiments, some of the layers 205-235 are separated into separate, more numerous layers. In some embodiments, some of the layers 205-235 are removed while others may be added.

The IoT platform 125 is a model-driven architecture. Thus, the extensible object model 250 communicates with each layer 205-230 to contextualize site data of the enterprise 160a-160n using an extensible graph-based object model (or "asset model"). In one or more embodiments, the extensible object model 250 is associated with knowledge graphs 251 where the equipment (e.g., edge devices 161a-161n) and processes of the enterprise 160a-160n are modeled. The knowledge graphs 251 of EOM 250 are configured to store the models in a central location. The knowledge graphs 251 define a collection of nodes and links that describe real-world connections that enable smart systems. As used herein, a knowledge graph 251: (i) describes real-world entities (e.g., edge devices 161a-161n) and their interrelations organized in a graphical interface; (ii) defines possible classes and relations of entities in a schema; (iii) enables interrelating arbitrary entities with each other; and (iv) covers various topical domains. In other words, the knowledge graphs 251 define large networks of entities (e.g., edge devices 161a-161n), semantic types of the entities, properties of the entities, and relationships between the entities. Thus, the knowledge graphs 251 describe a network of "things" that are relevant to a specific domain or to an enterprise or organization. Knowledge graphs 251 are not limited to abstract concepts and relations, but can also contain instances of objects, such as, for example, documents and datasets. In some embodiments, the knowledge graphs 251 include resource description framework (RDF) graphs. As used herein, a "RDF graph" is a graph data model that formally describes the semantics, or meaning, of information. The RDF graph also represents metadata (e.g., data that describes data). According to various embodiments, knowledge graphs 251 also include a semantic object model. The semantic object model is a subset of a knowledge graph 251 that defines semantics for the knowledge graph 251. For example, the semantic object model defines the schema for the knowledge graph 251.

As used herein, EOM 250 includes a collection of APIs that enables seeded semantic object models to be extended. For example, the EOM 250 of the present disclosure enables a user's knowledge graph 251 to be built subject to constraints expressed in the user's semantic object model. Thus, the knowledge graphs 251 are generated by users (e.g., enterprises or organizations) to create models of the edge devices 161a-161n of an enterprise 160a-160n, and the knowledge graphs 251 are input into the EOM 250 for visualizing the models (e.g., the nodes and links).

The models describe the assets (e.g., the nodes) of an enterprise (e.g., the edge devices 161a-161n) and describe the relationship of the assets with other components (e.g., the links). The models also describe the schema (e.g., describe what the data is), and therefore the models are self-validating. For example, in one or more embodiments, the model describes the type of sensors mounted on any given asset (e.g., edge device 161a-161n) and the type of data that is being sensed by each sensor. According to various embodiments, a KPI framework is used to bind properties of the assets in the extensible object model 250 to inputs of the KPI framework. Accordingly, the IoT platform 125 is an extensible, model-driven end-to-end stack including: two-way model sync and secure data exchange between the edge 115 and the cloud 105, metadata driven data processing (e.g., rules, calculations, and aggregations), and model driven visualizations and applications. As used herein, "extensible" refers to the ability to extend a data model to include new properties/columns/fields, new classes/tables, and new relations. Thus, the IoT platform 125 is extensible with regards to edge devices 161a-161n and the applications 146 that handle those devices 161a-161n. For example, when new edge devices 161a-161n are added to an enterprise 160a-160n system, the new devices 161a-161n will automatically appear in the IoT platform 125 so that the corresponding applications 146 understand and use the data from the new devices 161a-161n.

In some cases, asset templates are used to facilitate configuration of instances of edge devices 161a-161n in the model using common structures. An asset template defines the typical properties for the edge devices 161a-161n of a given enterprise 160a-160n for a certain type of device. For example, an asset template of a pump includes modeling the pump having inlet and outlet pressures, speed, flow, etc. The templates may also include hierarchical or derived types of edge devices 161a-161n to accommodate variations of a base type of device 161a-161n. For example, a reciprocating pump is a specialization of a base pump type and would include additional properties in the template. Instances of the edge device 161a-161n in the model are configured to match the actual, physical devices of the enterprise 160a-160n using the templates to define expected attributes of the device 161a-161n. Each attribute is configured either as a static value (e.g., capacity is 1000 BPH) or with a reference to a time series tag that provides the value. The knowledge graph 251 can automatically map the tag to the attribute based on naming conventions, parsing, and matching the tag and attribute descriptions and/or by comparing the behavior of the time series data with expected behavior. In one or more embodiments, each of the key attribute contributing to one or more metrics to drive a dashboard is marked with one or more metric tags such that a dashboard visualization is generated.

The modeling phase includes an onboarding process for syncing the models between the edge 115 and the cloud 105. For example, in one or more embodiments, the onboarding process includes a simple onboarding process, a complex onboarding process, and/or a standardized rollout process. The simple onboarding process includes the knowledge graph 251 receiving raw model data from the edge 115 and running context discovery algorithms to generate the model. The context discovery algorithms read the context of the edge naming conventions of the edge devices 161a-161n and determine what the naming conventions refer to. For example, in one or more embodiments, the knowledge graph 251 receives "TMP" during the modeling phase and determine that "TMP" relates to "temperature." The generated models are then published. The complex onboarding process includes the knowledge graph 251 receiving the raw model data, receiving point history data, and receiving site survey data. According to various embodiments, the knowledge graph 251 then uses these inputs to run the context discovery algorithms. According to various embodiments, the generated models are edited and then the models are published. The standardized rollout process includes manually defining standard models in the cloud 105 and pushing the models to the edge 115.

The IoT layer 205 includes one or more components for device management, data ingest, and/or command/control of the edge devices 161a-161n. The components of the IoT layer 205 enable data to be ingested into, or otherwise received at, the IoT platform 125 from a variety of sources. For example, in one or more embodiments, data is ingested from the edge devices 161a-161n through process historians or laboratory information management systems. The IoT layer 205 is in communication with the edge connectors 165a-165n installed on the edge gateways 162a-162n through network 110, and the edge connectors 165a-165n send the data securely to the IoT layer 205. In some embodiments, only authorized data is sent to the IoT platform 125, and the IoT platform 125 only accepts data from authorized edge gateways 162a-162n and/or edge devices 161a-161n. According to various embodiments, data is sent from the edge gateways 162a-162n to the IoT platform 125 via direct streaming and/or via batch delivery. Further, after any network or system outage, data transfer will resume once communication is re-established and any data missed during the outage will be backfilled from the source system or from a cache of the IoT platform 125. According to various embodiments, the IoT layer 205 also includes components for accessing time series, alarms and events, and transactional data via a variety of protocols.

The enterprise integration layer 210 includes one or more components for events/messaging, file upload, and/or REST/OData. The components of the enterprise integration layer 210 enable the IoT platform 125 to communicate with third party cloud applications 211, such as any application(s) operated by an enterprise in relation to its edge devices. For example, the enterprise integration layer 210 connects with enterprise databases, such as guest databases, user databases, financial databases, patient databases, etc. The enterprise integration layer 210 provides a standard API to third parties for accessing the IoT platform 125. The enterprise integration layer 210 also enables the IoT platform 125 to communicate with the OT systems 163a-163n and IT applications 164a-164n of the enterprise 160a-160n. Thus, the enterprise integration layer 210 enables the IoT platform 125 to receive data from the third-party applications 211 rather than, or in combination with, receiving the data from the edge devices 161a-161n directly.

The data pipeline layer 215 includes one or more components for data cleansing/enriching, data transformation, data calculations/aggregations, and/or API for data streams. Accordingly, in one or more embodiments, the data pipeline layer 215 pre-processes and/or performs initial analytics on the received data. The data pipeline layer 215 executes advanced data cleansing routines including, for example, data correction, mass balance reconciliation, data conditioning, component balancing and simulation to ensure the desired information is used as a basis for further processing. The data pipeline layer 215 also provides advanced and fast computation. For example, cleansed data is run through enterprise-specific digital twins. According to various embodiments, the enterprise-specific digital twins include a reliability advisor containing process models to determine the current operation and the fault models to trigger any early detection and determine an appropriate resolution. According to various embodiments, the digital twins also include an optimization advisor that integrates real-time economic data with real-time process data, selects the right feed for a process, and determines optimal process conditions and product yields.

According to various embodiments, the data pipeline layer 215 employs models and templates to define calculations and analytics. Additionally or alternatively, according to various embodiments, the data pipeline layer 215 employs models and templates to define how the calculations and analytics relate to the assets (e.g., the edge devices 161a-161n). For example, in an embodiment, a pump template defines pump efficiency calculations such that every time a pump is configured, the standard efficiency calculation is automatically executed for the pump. The calculation model defines the various types of calculations, the type of engine that should run the calculations, the input and output parameters, the preprocessing requirement and prerequisites, the schedule, etc. According to various embodiments, the actual calculation or analytic logic is defined in the template or it may be referenced. Thus, according to various embodiments, the calculation model is employed to describe and control the execution of a variety of different process models. According to various embodiments, calculation templates are linked with the asset templates such that when an asset (e.g., edge device 161a-161n) instance is created, any associated calculation instances are also created with their input and output parameters linked to the appropriate attributes of the asset (e.g., edge device 161a-161n).

According to various embodiments, the IoT platform 125 supports a variety of different analytics models including, for example, first principles models, empirical models, engineered models, user-defined models, machine learning models, built-in functions, and/or any other types of analytics models. Fault models and predictive maintenance models will now be described by way of example, but any type of models may be applicable.

Fault models are used to compare current and predicted enterprise 160a-160n performance to identify issues or opportunities, and the potential causes or drivers of the issues or opportunities. The IoT platform 125 includes rich hierarchical symptom-fault models to identify abnormal conditions and their potential consequences. For example, in one or more embodiments, the IoT platform 125 drill downs from a high-level condition to understand the contributing factors, as well as determining the potential impact a lower level condition may have. There may be multiple fault models for a given enterprise 160a-160n looking at different aspects such as process, equipment, control, and/or operations. According to various embodiments, each fault model identifies issues and opportunities in their domain, and can also look at the same core problem from a different perspective. According to various embodiments, an overall fault model is layered on top to synthesize the different perspectives from each fault model into an overall assessment of the situation and point to the true root cause.

According to various embodiments, when a fault or opportunity is identified, the IoT platform 125 provides recommendations about an optimal corrective action to take. Initially, the recommendations are based on expert knowledge that has been preprogrammed into the system by process and equipment experts. A recommendation services module presents this information in a consistent way regardless of source, and supports workflows to track, close out, and document the recommendation follow-up. According to various embodiments, the recommendation follow-up is employed to improve the overall knowledge of the system over time as existing recommendations are validated (or not) or new cause and effect relationships are learned by users and/or analytics.

According to various embodiments, the models are used to accurately predict what will occur before it occurs and interpret the status of the installed base. Thus, the IoT platform 125 enables operators to quickly initiate maintenance measures when irregularities occur. According to various embodiments, the digital twin architecture of the IoT platform 125 employs a variety of modeling techniques. According to various embodiments, the modeling techniques include, for example, rigorous models, fault detection and diagnostics (FDD), descriptive models, predictive maintenance, prescriptive maintenance, process optimization, and/or any other modeling technique.

According to various embodiments, the rigorous models are converted from process design simulation. In this manner, process design is integrated with feed conditions and production requirement. Process changes and technology improvement provide business opportunities that enable more effective maintenance schedule and deployment of resources in the context of production needs. The fault detection and diagnostics include generalized rule sets that are specified based on industry experience and domain knowledge and can be easily incorporated and used working together with equipment models. According to various embodiments, the descriptive models identifies a problem and the predictive models determines possible damage levels and maintenance options. According to various embodiments, the descriptive models include models for defining the operating windows for the edge devices 161a-161n.

Predictive maintenance includes predictive analytics models developed based on rigorous models and statistic models, such as, for example, principal component analysis (PCA) and partial least square (PLS). According to various embodiments, machine learning methods are applied to train models for fault prediction. According to various embodiments, predictive maintenance leverages FDD-based algorithms to continuously monitor individual control and equipment performance. Predictive modeling is then applied to a selected condition indicator that deteriorates in time. Prescriptive maintenance includes determining an optimal maintenance option and when it should be performed based on actual conditions rather than time-based maintenance schedule. According to various embodiments, prescriptive analysis selects the right solution based on the company's capital, operational, and/or other requirements. Process optimization is determining optimal conditions via adjusting set-points and schedules. The optimized set-points and schedules can be communicated directly to the underlying controllers, which enables automated closing of the loop from analytics to control.

The data insight layer 220 includes one or more components for time series databases (TDSB), relational/document databases, data lakes, blob, files, images, and videos, and/or an API for data query. According to various embodiments, when raw data is received at the IoT platform 125, the raw data is stored as time series tags or events in warm storage (e.g., in a TSDB) to support interactive queries and to cold storage for archive purposes. According to various embodiments, data is sent to the data lakes for offline analytics development. According to various embodiments, the data pipeline layer 215 accesses the data stored in the databases of the data insight layer 220 to perform analytics, as detailed above.

The application services layer 225 includes one or more components for rules engines, workflow/notifications, KPI framework, insights (e.g., actionable insights), decisions, recommendations, machine learning, and/or an API for application services. The application services layer 225 enables building of applications 146a-d. The applications layer 230 includes one or more applications 146a-d of the IoT platform 125. For example, according to various embodiments, the applications 146a-d includes a buildings application 146a, a plants application 146b, an aero application 146c, and other enterprise applications 146d. According to various embodiments, the applications 146 includes general applications 146 for portfolio management, asset management, autonomous control, and/or any other custom applications. According to various embodiments, portfolio management includes the KPI framework and a flexible user interface (UI) builder. According to various embodiments, asset management includes asset performance and asset health. According to various embodiments, autonomous control includes energy optimization and/or predictive maintenance. As detailed above, according to various embodiments, the general applications 146 is extensible such that each application 146 is configurable for the different types of enterprises 160a-160n (e.g., buildings application 146a, plants application 146b, aero application 146c, and other enterprise applications 146d).

The applications layer 230 also enables visualization of performance of the enterprise 160a-160n. For example, dashboards provide a high-level overview with drill downs to support deeper investigations. Recommendation summaries give users prioritized actions to address current or potential issues and opportunities. Data analysis tools support ad hoc data exploration to assist in troubleshooting and process improvement.

The core services layer 235 includes one or more services of the IoT platform 125. According to various embodiments, the core services 235 include data visualization, data analytics tools, security, scaling, and monitoring. According to various embodiments, the core services 235 also include services for tenant provisioning, single login/common portal, self-service admin, UI library/UI tiles, identity/access/ entitlements, logging/monitoring, usage metering, API gateway/dev portal, and the IoT platform 125 streams.

Figure 3:
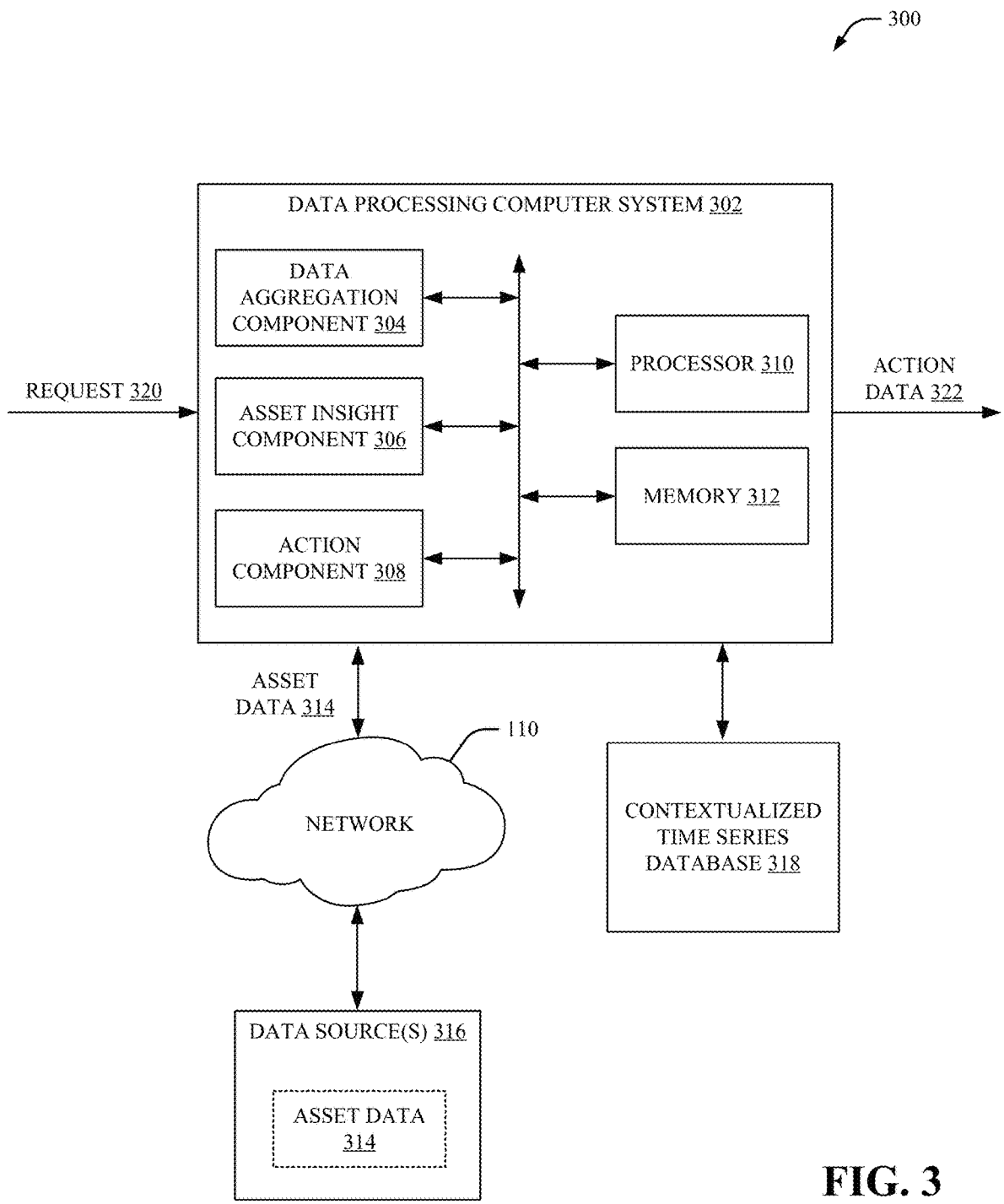
FIG. 3 illustrates a system that provides an exemplary environment associated with a data processing computer system, in accordance with one or more embodiments described herein.

FIG. 3 illustrates a system 300 that provides an exemplary environment according to one or more described features of one or more embodiments of the disclosure. According to an embodiment, the system 300 includes a data processing computer system 302 to facilitate a practical application of Internet of Things (IoT) technology, data analytics technology, data modeling technology, and/or digital transformation technology to provide optimization and/or cloud services related to enterprise performance management. In one or more embodiments, the data processing computer system 302 facilitates a practical application of machine learning technology to provide optimization and/or cloud services related to enterprise performance management. In one or more embodiments, the data processing computer system 302 facilitates a practical application of contextualized time series data consumption. In one or more embodiments, the data processing computer system 302 facilitates a practical application of contextualized time series database management. In one or more embodiments, the data processing computer system 302 analyzes data that is ingested, cleaned and/or aggregated from one or more information technology data sources to provide cost saving insights and/or efficiency insights for an enterprise system.

In an embodiment, the data processing computer system 302 is a server system (e.g., a server device) that facilitates a data analytics platform between one or more computing devices and one or more data sources. In one or more embodiments, the data processing computer system 302 is a device with one or more processors and a memory. In one or more embodiments, the data processing computer system 302 is a computer system from the computer systems 120. For example, in one or more embodiments, the data processing computer system 302 is implemented via the cloud 105. The data processing computer system 302 is also related to one or more technologies, such as, for example, enterprise technologies, enterprise cloud service technologies, data analytics technologies, data modeling technologies, digital transformation technologies, cloud computing technologies, cloud database technologies, server technologies, network technologies, wireless communication technologies, natural language processing technologies, machine learning technologies, artificial intelligence technologies, digital processing technologies, electronic device technologies, computer technologies, industrial technologies, industrial IoT technologies, supply chain analytics technologies, aircraft technologies, building technologies, cybersecurity technologies, navigation technologies, asset visualization technologies, oil and gas technologies, petrochemical technologies, refinery technologies, process plant technologies, procurement technologies, and/or one or more other technologies.

Moreover, the data processing computer system 302 provides an improvement to one or more technologies such as enterprise technologies, enterprise cloud service technologies, data analytics technologies, data modeling technologies, digital transformation technologies, cloud computing technologies, cloud database technologies, server technologies, network technologies, wireless communication technologies, natural language processing technologies, machine learning technologies, artificial intelligence technologies, digital processing technologies, electronic device technologies, computer technologies, industrial technologies, industrial IoT technologies, supply chain analytics technologies, aircraft technologies, building technologies, cybersecurity technologies, navigation technologies, asset visualization technologies, oil and gas technologies, petrochemical technologies, refinery technologies, process plant technologies, procurement technologies, and/or one or more other technologies. In an implementation, the data processing computer system 302 improves performance of a computing device. For example, in one or more embodiments, the data processing computer system 302 improves processing efficiency of a computing device (e.g., a server), reduces power consumption of a computing device (e.g., a server), improves quality of data provided by a computing device (e.g., a server), etc.

The data processing computer system 302 includes a data aggregation component 304, an asset insight component 306 and/or an action component 308. Additionally, in certain embodiments, the data processing computer system 302 includes a processor 310 and/or a memory 312. In certain embodiments, one or more aspects of the data processing computer system 302 (and/or other systems, apparatuses and/or processes disclosed herein) constitute executable instructions embodied within a computer-readable storage medium (e.g., the memory 312). For instance, in an embodiment, the memory 312 stores computer executable component and/or executable instructions (e.g., program instructions). Furthermore, the processor 310 facilitates execution of the computer executable components and/or the executable instructions (e.g., the program instructions). In an example embodiment, the processor 310 is configured to execute instructions stored in the memory 312 or otherwise accessible to the processor 310.

The processor 310 is a hardware entity (e.g., physically embodied in circuitry) capable of performing operations according to one or more embodiments of the disclosure. Alternatively, in an embodiment where the processor 310 is embodied as an executor of software instructions, the software instructions configure the processor 310 to perform one or more algorithms and/or operations described herein in response to the software instructions being executed. In an embodiment, the processor 310 is a single core processor, a multi-core processor, multiple processors internal to the data processing computer system 302, a remote processor (e.g., a processor implemented on a server), and/or a virtual machine. In certain embodiments, the processor 310 is in communication with the memory 312, the data aggregation component 304, the asset insight component 306 and/or the action component 308 via a bus to, for example, facilitate transmission of data among the processor 310, the memory 312, the data aggregation component 304, the asset insight component 306 and/or the action component 308. The processor 310 may embodied in a number of different ways and can, in certain embodiments, includes one or more processing devices configured to perform independently. Additionally or alternatively, in one or more embodiments, the processor 310 includes one or more processors configured in tandem via a bus to enable independent execution of instructions, pipelining of data, and/or multi-thread execution of instructions. In one or more embodiments, the asset insight component 306 is configured for distributed processing. For example, in one or more embodiments, one or more network layers are implemented between the asset insight component 306 and the processor 310 (and/or the memory 312).

The memory 312 is non-transitory and includes, for example, one or more volatile memories and/or one or more non-volatile memories. In other words, in one or more embodiments, the memory 312 is an electronic storage device (e.g., a computer-readable storage medium). The memory 312 is configured to store information, data, content, one or more applications, one or more instructions, or the like, to enable the data processing computer system 302 to carry out various functions in accordance with one or more embodiments disclosed herein. As used herein in this disclosure, the term "component," "system," and the like, is a computer-related entity. For instance, "a component," "a system," and the like disclosed herein is either hardware, software, or a combination of hardware and software. As an example, a component is, but is not limited to, a process executed on a processor, a processor, circuitry, an executable component, a thread of instructions, a program, and/or a computer entity.

In an embodiment, the data processing computer system 302 (e.g., the data aggregation component 304 of the data processing computer system 302) receives asset data 314. In one or more embodiments, the data processing computer system 302 (e.g., the data aggregation component 304 of the data processing computer system 302) receives the asset data 314 from one or more data sources 316. In certain embodiments, at least one data source from the one or more data sources 316 incorporates encryption capabilities to facilitate encryption of one or more portions of the asset data 314. In certain embodiments, the one or more data sources 316 are one or more IT data sources. Additionally, in one or more embodiments, the data processing computer system 302 (e.g., the data aggregation component 304 of the data processing computer system 302) receives the asset data 314 via the network 110. In one or more embodiments, the network 110 is a Wi-Fi network, a Near Field Communications (NFC) network, a Worldwide Interoperability for Microwave Access (WiMAX) network, a personal area network (PAN), a short-range wireless network (e.g., a Bluetooth® network), an infrared wireless (e.g., IrDA) network, an ultra-wideband (UWB) network, an induction wireless transmission network, and/or another type of network. In one or more embodiments, the one or more data sources 316 are associated with components of the edge 115 such as, for example, one or more edge devices from the edge devices 161a-161n.

In an embodiment, the data processing computer system 302 (e.g., the data aggregation component 304 of the data processing computer system 302) is configured to access asset data 314 provided by the edge devices 161a-161n. For example, in one or more embodiments, the data processing computer system 302 (e.g., the data aggregation component 304 of the data processing computer system 302) receives the asset data 314 from the edge devices 161a-161n. The asset data 314 includes, for example, sensor data, site data (e.g., specific site data for a respective asset infrastructure 303a-n), real-time data, live property value data, historical data, event data, process data, operational data, fault data, asset infrastructure data, connected building data, location data, and/or other data associated with the edge devices 161a-161n. In one or more embodiments, the edge devices 161a-161n are associated with one or more asset infrastructures. In one or more embodiments, the asset data 314 additionally or alternatively includes billing data, logging information, issue resolution data, application updates, application configuration data, application update data, telemetry data, monitoring data, and/or other data.

In one or more embodiments, the one or more data sources 316 include one or more assets. For example, the one or more data sources 316 include, in one or more embodiments, one or more databases, one or more assets (e.g., one or more building assets, one or more industrial assets, etc.), one or more IoT devices (e.g., one or more industrial IoT devices), one or more connected building assets, one or more sensors, one or more actuators, one or more processors, one or more computers, one or more valves, one or more pumps (e.g., one or more centrifugal pumps, etc.), one or more motors, one or more compressors, one or more turbines, one or more ducts, one or more heaters, one or more chillers, one or more coolers, one or more boilers, one or more furnaces, one or more heat exchangers, one or more fans, one or more blowers, one or more conveyor belts, one or more vehicle components, one or more cameras, one or more displays, one or more security components, one or more air handler units, one or more HVAC components, industrial equipment, factory equipment, and/or one or more other devices that are connected to the network 110 for collecting, sending, and/or receiving information. In one or more embodiments, the one or more data sources 316 include, or is otherwise in communication with, one or more controllers for selectively controlling a respective data source and/or for sending/receiving information between the one or more data sources 316 and the data processing computer system 302 via the network 110.

In one or more embodiments, the data aggregation component 304 aggregates the asset data 314 from the one or more data sources 316. For instance, in one or more embodiments, the data aggregation component 304 aggregates the asset data 314 into a contextualized time series database 318. In one or more embodiments, the contextualized time series database 318 is a centralized repository that stores unstructured data and/or structured data included in the asset data 314. In one or more embodiments, the data aggregation component 304 repeatedly updates data of the contextualized time series database 318 at one or more predetermined intervals. For instance, in one or more embodiments, the data aggregation component 304 stores new data and/or modified data associated with the one or more data sources 316. In one or more embodiments, the data aggregation component 304 repeatedly scans the one or more data sources 316 to determine new data for storage in the contextualized time series database 318.

In one or more embodiments, data associated with the contextualized time series database 318 is in communication with a cloud application that is accessible by select number of users. For example, in one or more embodiments, the cloud application associated with the contextualized time series database 318 is a cloud application accessible by users associated with the edge devices 161a-n. In one or more embodiments, the cloud application is a computing service provided by any type or combination of application servers, communication servers, web servers, super-computing servers, database servers, file servers, mail servers, proxy servers, and/virtual servers. Additionally, in one or more embodiments, the cloud application manages data associated with the contextualized time series database 318.

In one or more embodiments, the data aggregation component 304 identifies and/or groups data types associated with the asset data 314 based on one or more user identifiers associated with the cloud application, one or more event identifiers associated with one or more assets, and/or one or more alarm identifiers associated with one or more assets. In one or more embodiments, the data aggregation component 304 employs batching, concatenation of the asset data 314, identification of data types, merging of the asset data 314, grouping of the asset data 314, reading of the asset data 314 and/or writing of the asset data 314 to facilitate providing data for the contextualized time series database 318. In one or more embodiments, the data aggregation component 304 groups data from the asset data 314 based on corresponding attributes and/or corresponding features of the data. In one or more embodiments, the data aggregation component 304 groups data from the asset data 314 based on corresponding identifiers (e.g., a matching asset hierarchy level, a matching asset, a matching connected building, etc.) for the asset data 314. In one or more embodiments, the data aggregation component 304 employs one or more locality-sensitive hashing techniques to group data from the asset data 314 based on similarity scores and/or calculated distances between different data in the asset data 314. In one or more embodiments, the data aggregation component 304 formats data associated with the contextualized time series database 318 (e.g., contextualized time series data) based on the one or more user identifiers, the one or more event identifiers, and/or the one or more alarm identifiers. In one or more embodiments, the data aggregation component 304 filters one or more portions of data associated with the contextualized time series database 318 (e.g., contextualized time series data) based on the one or more user identifiers, the one or more event identifiers, and/or the one or more alarm identifiers.

In one or more embodiments, the data aggregation component 304 employs a descriptive model related to management of one or more networks, one or more virtual machines, one or more load balancers, connection topology, and/or other infrastructure portions of the cloud application to facilitate management of data associated with the contextualized time series database 318. In one or more embodiments, the data aggregation component 304 additionally or alternatively performs a monitoring process associated with the cloud application to facilitate management of data associated with the contextualized time series database 318. For example, monitoring process includes monitoring of one or more networks, one or more virtual machines, one or more load balancers, connection topology, and/or other infrastructure portions of the cloud application.

In one or more embodiments, the data aggregation component 304 formats one or more portions of the asset data 314 stored in the contextualized time series database 318. For instance, in one or more embodiments, the data aggregation component 304 provides a formatted version of the asset data 314 for storage in the contextualized time series database 318. In an embodiment, a formatted version of the asset data 314 is formatted with one or more defined formats for the contextualized time series database 318. A defined format is, for example, a structure for data fields. In one embodiment, a defined format is predetermined. For example, in one or more embodiments, a predominant type of structure (e.g., a predominant type of format, predominant type of procurement form, etc.) may be employed as a template for future use. In another embodiment, the defined format is determined based on analysis of the asset data 314 (e.g., in response to a majority of the asset data 314 being received). In various embodiments, the formatted version of the asset data 314 is stored in the contextualized time series database 318.

In one or more embodiments, the data aggregation component 304 identifies one or more different data fields in the asset data 314 that describe a corresponding subject. For example, in one or more embodiments, the data aggregation component 304 identifies one or more different data fields in the asset data 314 that describe a corresponding attribute and/or a corresponding feature. In one or more embodiments, the data aggregation component 304 extracts data from the asset data 314 using one or more natural language processing techniques. In one or more embodiments, the data aggregation component 304 determines one or more data elements, one or more words, and/or one or more phrases associated with the asset data 314. In one or more embodiments, the data aggregation component 304 determines predicts data for a data field based on a particular intent associated with different data elements, words, and/or phrases associated with the asset data 314. In one or more embodiments, the data aggregation component 304 identifies and/or groups data types associated with the asset data 314 based on a hierarchical data format. In one or more embodiments, the data aggregation component 304 employs batching, concatenation of data columns, identification of data types, merging of data, reading of data and/or writing of data to facilitate data mapping associated with the asset data 314. In one or more embodiments, the data aggregation component 304 performs attribute processing to remove one or more defined characters (e.g., special characters), tokenize one or more strings of characters, remove one or more defined words (e.g., one or more stop words), remove one or more single character tokens, and/or other attributes processing with respect to the asset data 314. In one or more embodiments, the data aggregation component 304 groups data from the asset data 314 based on corresponding attributes of the data. In one or more embodiments, the data aggregation component 304 groups data from the asset data 314 based on corresponding identifiers (e.g., a matching part commodity family) for the data. In one or more embodiments, the data aggregation component 304 employs one or more locality-sensitive hashing techniques to group data from the asset data 314 based on similarity scores and/or calculated distances between different data in the asset data 314.

In one or more embodiments, the data aggregation component 304 organizes data associated with the contextualized time series database 318 based on an ontological tree structure. The ontological tree structure is configured to capture relationships among different portions of data associated with the contextualized time series database 318 (e.g., contextualized time series data). For instance, in one or more embodiments, the data aggregation component 304 employs a hierarchical data format technique to organize the data associated with contextualized time series database 318 in the ontological tree structure. In an embodiment, the ontological tree structure captures relationships among different data within the asset data 314 based on a hierarchy of nodes and connections among the different data within the asset data 314. In an embodiment, a node of the ontological tree structure corresponds to a data element and a connection of the ontological tree structure represents a relationship between nodes (e.g., data elements) of the ontological tree structure. In one or more embodiments, the data aggregation component 304 organizes contextualized time series data based on the ontological tree structure. In one or more embodiments, the data aggregation component 304 traverses the ontological tree structure to traverse associating aspects of the asset data 314. In one or more embodiments, the data aggregation component 304 compares different data sources of the one or more data sources 316 and/or data from different data sources of the one or more data sources 316 based on the ontological tree structure.

In one or more embodiments, the data aggregation component 304 generates one or more attributes associated with a format structure for the asset data 314. In one or more embodiments, the data aggregation component 304 processes streaming data related to the one or more assets to determine the asset data 314 related to the one or more assets. In one or more embodiments, the data aggregation component 304 generates one or more attributes based on one or more classifications with respect to the asset data 314 related to the one or more assets.

In one or more embodiments, the data aggregation component 304 generates one or more attributes associated with one or more defined formats for the format structure. The format structure is, for example, a target format structure for the asset data 314. In one or more embodiments, the format structure is a format structure for one or more portions of the contextualized time series database 318. In an embodiment, the one or more attributes include one or more data field attributes for the format structure. For example, in an embodiment, the one or more attributes include one or more column name attributes for the format structure. Additionally or alternatively, in an embodiment, the one or more attributes include one or more column value attributes for the format structure. However, it is to be appreciated that the one or more attributes can additionally or alternatively include one or more other types of attributes associated with the format structure. In certain embodiments, the one or more attributes generated by the data aggregation component 304 include one or more text embeddings for column names associated with the format structure. For example, in certain embodiments, the one or more attributes generated by the data aggregation component 304 include one or more text embeddings for column names associated with a source column name and/or a target column name for one or more portions of the asset data 314. Additionally or alternatively, in certain embodiments, the one or more attributes generated by the data aggregation component 304 include one or more text embeddings for column values associated with the format structure. In certain embodiments, the data aggregation component 304 learns one or more vector representations of the one or more text embeddings associated with the column names and/or column values. In one or more embodiments, the attributes include a timestamp attribute associated with the asset data 314, an item name attribute associated with the asset data 314, a value attribute associated with the asset data 314, system attribute associated with the asset data 314, a quality attribute associated with the asset data 314, an asset identifier (e.g., an asset name) associated with the asset data 314, an assembly line identifier associated with the asset data 314, packaging line identifier associated with the asset data 314, a location attribute associated with the asset data 314, a building identifier (e.g., a building name) associated with the asset data 314, a plant identifier (e.g., an industrial plant name, a processing plant name, etc.), a unit of measure attribute associated with the asset data 314, a role attribute associated with the asset data 314, a site attribute associated with the asset data 314, and/or another type of attribute associated with the asset data 314.

The data aggregation component 304 generates the one or more attributes associated with the format structure for the asset data 314 based on one or more feature generation techniques. In an embodiment, the data aggregation component 304 generates the one or more attributes associated with the format structure for the asset data 314 based on a classifier trained based on natural language processing where respective portions of the asset data 314 is converted into a numerical format represented by a matrix. In another embodiment, the data aggregation component 304 generates the one or more attributes associated with the format structure for the asset data 314 based on SIF where sentence embeddings are computing using word vector averaging of one or more portions of the asset data 314. In another embodiment, the data aggregation component 304 generates the one or more attributes associated with the format structure for the asset data 314 based on a universal sentence encoder that encodes one or more portions of the asset data 314 into dimensional vectors to facilitate text classification and/or other natural language processing associated with the one or more portions of the asset data 314. In another embodiment, the data aggregation component 304 generates the one or more attributes associated with the format structure for the asset data 314 based on a BERT embedding technique that employs tokens associated with classification tasks to facilitate text classification and/or other natural language processing associated with the one or more portions of the asset data 314. Additionally or alternatively, the data aggregation component 304 generates the one or more attributes associated with the format structure for the asset data 314 based on a library of learned word embeddings and/or text classifications associated with natural language processing. In certain embodiments, the data aggregation component 304 generates the one or more attributes based on vocabulary ground truth data associated with one or more templates. For instance, in one or more embodiments, the data aggregation component 304 generates vocabulary ground truth data for the format structure based on one or more templates associated with historical disparate data. Furthermore, based on the vocabulary ground truth data associated with the historical disparate data, the data aggregation component 304 generates the one or more attributes.

In one or more embodiments, the data aggregation component 304 maps, based on the one or more attributes, respective portions of the asset data 314 to provide the formatted version of asset data 314. In an embodiment, the data aggregation component 304 maps the respective portions of the asset data 314 based on the one or more text embeddings associated with the column names for the format structure. Additionally, in one or more embodiments, the data aggregation component 304 maps the respective portions of the asset data 314 based on decision tree classification associated with the column names for the format structure. In certain embodiments, the data aggregation component 304 calculates one or more similarity scores between one or more source column names and one or more defined target column names to facilitate mapping respective portions of the asset data 314 to provide the formatted version of asset data 314. In certain embodiments, the data aggregation component 304 maps the respective portions of the asset data 314 based on a set of transformer encoder layers associated with a neural network. Additionally or alternatively, in certain embodiments, the data aggregation component 304 maps the respective portions of the asset data 314 based on a text classifier associated with a neural network.

In an embodiment, the asset insight component 306 performs a deep learning process with respect to the asset data 314. For instance, in one or more embodiments, the asset insight component 306 performs a deep learning process with respect to the asset data 314 determine one or more classifications, one or more inferences, and/or one or more insights associated with the asset data 314. In certain embodiments, the deep learning process performed by the asset insight component 306 employs regression analysis to determine one or more insights associated with the asset data 314. In certain embodiments, the deep learning process performed by the asset insight component 306 employs a clustering technique to determine one or more insights associated with the asset data 314. In one or more embodiments, the asset insight component 306 performs the deep learning process to determine one or more categories and/or one or more patterns associated with the asset data 314. In one or more embodiments, the asset insight component 306 employs a recurrent neural network to map the asset data 314 into multi-dimensional word embeddings for the ontological tree structure. In an embodiment, a word embedding corresponds to a node of the ontological tree structure. In one or more embodiments, the asset insight component 306 employs a network of gated-recurrent units of the recurrent neural network to provide one or more classifications, one or more inferences, and/or one or more insights associated with the asset data 314.

In one or more embodiments, the data processing computer system 302 (e.g., the asset insight component 306 of the data processing computer system 302) receives a request 320. In an embodiment, the request 320 is a request to generate contextualized time series data related to one or more assets. In another embodiment, the request 320 is a request to obtain one or more insights with respect to contextualized time series data related to one or more assets. For instance, in one or more embodiments, the request 320 is a request to obtain one or more insights with respect to data stored in the contextualized time series database 318. In one or more embodiments, the request 320 is a request to additionally or alternatively determine one or more insights related to edge devices 161a-161n. In one or more embodiments, the one or more insights are one or more asset insights, one or more insights for a dashboard visualization, one or more worker assist insights, one or more energy optimization insights, one or more asset performance insights, one or more asset health insights, one or more digitized maintenance insights, and/or one or more other insights with respect to contextualized time series data related to one or more assets. In an embodiment, the request 320 is an API command request generated via visual display of a computing device. For example, the request 320 can be is an API command request associated with an API call that is received via a user-interactive electronic interface of a computing device associated with a user.

In one or more embodiments, the request 320 includes a user identifier indicating an identity of a user associated with the request 320. A user identifier includes, for example, a user identifier for a user role name (e.g., a manager, an executive, a maintenance engineer, a process engineer, etc.) associated with the request 320. Additionally or alternatively, in one or more embodiments, the request 320 includes one or more event identifiers associated with one or more predefined events capable of occurring for one or more assets. Additionally or alternatively, in one or more embodiments, the request 320 includes one or more alarm identifiers associated with one or more predefined alarms capable of being triggered for one or more assets. Additionally or alternatively, in one or more embodiments, the request 320 includes one or more insight descriptors describing a goal for the one or more insights. In one or more embodiments, a goal for the one or more insights includes context for a goal, a type of insight (e.g., an information request, a question, a worker assist insight, an energy optimization insight, an asset performance insight, an asset health insight, a digitized maintenance insight, etc.), and/or another type of goal. For example, in one or more embodiments, the goal is a worker insight goal, an energy optimization goal, an asset performance goal, an asset health goal, a digitized maintenance goal, and/or another insight goal. In one or more embodiments, the goal is a desired data analytics result and/or target associated with the asset data 114. In an embodiment, the insight descriptor is a word or a phrase that describes the goal for the one or more insights. In another embodiment, the insight descriptor is an identifier that describes the goal for the one or more insights. In yet another embodiment, the insight descriptor is a subject that describes the goal for the one or more insights. However, it is to be appreciated that, in certain embodiments, the insight descriptor is another type of descriptor that describes the goal for the one or more insights. In various embodiments, the request 320 is generated by an electronic interface of a computing device. Additionally, in one or more embodiments, the asset insight component 306 performs a deep learning process to provide one or more insights In one or more embodiments, the asset insight component 306 performs authorization of the request 320 with respect to the contextualized time series data (e.g., with respect to data stored in the contextualized time series database 318) based on the user identifier, the event identifier, and/or the alarm identifier. Additionally or alternatively, in one or more embodiments, the request 320 includes one or more geographic region identifiers indicating an identity of a geographic region associated with the request 320. For example, in one or more embodiments, the request 320 includes one or more geographic region identifiers indicating an identity of a geographic region associated with a computing device that generates the request 320. In one or more embodiments, the request 320 includes one or more asset descriptors that describe one or more assets in the portfolio of assets. For instance, in one or more embodiments, the request 320 includes one or more asset descriptors that describe the edge devices 161a-161n. An asset descriptor includes, for example, an asset name, an asset identifier, an asset level and/or other information associated with an asset. In certain embodiments, the asset descriptor is an asset infrastructure descriptor. For example, in certain embodiments, the asset descriptor includes an asset infrastructure asset name, an asset infrastructure identifier, and/or other information associated with an asset infrastructure from the asset infrastructures 303a-n. Additionally or alternatively, in one or more embodiments, the request 320 includes one or more metrics context identifiers describing context for the metrics. A metrics context identifier includes, for example, an identifier for an asset infrastructure metric, a plant performance metric, an asset performance metric, a goal (e.g., review production related to one or more assets, etc.). Additionally or alternatively, in one or more embodiments, the request 320 includes a time interval identifier describing an interval of time for the metrics. A time interval identifier describes, for example, an interval of time for aggregated data such as hourly, daily, monthly, yearly etc. In one or more embodiments, a time interval identifier is a reporting time identifier describing an interval of time for the metrics.

In one or more embodiments, in response to the request 320, the data aggregation component 304 contextualizes telemetry data associated with the one or more assets to generate the contextualized time series data. In one or more embodiments, the data aggregation component 304 contextualizes the telemetry data based on metadata and one or more data dimensionality filters (e.g., a set of data dimensionality filters) associated with the user identifier, the event identifier, and/or the alarm identifier. In one or more embodiments, the data aggregation component 304 allocates the contextualized time series data within a datastore configured for the user identifier, the event identifier, and/or the alarm identifier. For example, in one or more embodiments, the data aggregation component 304 allocates the contextualized time series data within a datastore configured for the user identifier, the event identifier, and/or the alarm identifier to facilitate obtaining one or more insights with respect to the contextualized time series data.

In one or more embodiments, in response to the request 320, the asset insight component 306 correlates attributes of the contextualized time series data based on the one or more insight descriptors to provide the one or more insights. For example, in one or more embodiments, the asset insight component 306 correlates attributes of data associated with the contextualized time series database 318 based on the one or more insight descriptors to provide the one or more insights. In one or more embodiments, in response to the request 320, the asset insight component 306 additionally or alternatively correlates attributes of the contextualized time series data based on the one or more insight descriptors to provide the one or more insights. Additionally or alternatively, in one or more embodiments, the asset insight component 306 additionally or alternatively correlates attributes of the contextualized time series data based on the one or more user identifiers, the one or more event identifiers, the one or more alarm identifiers, the one or more geographic region identifiers, the one or more asset descriptors, the one or more metrics context identifiers, and/or the time interval identifier. In one or more embodiments, the contextualized time series data (e.g., attributes of the contextualized time series data) provides spatial context and/or time-based context to the asset data 314. For example, in one or more embodiments, the contextualized time series data is contextualized data (e.g., contextualized IoT data) that is scaled and/or stored as tagged enriched data. Furthermore, in one or more embodiments, the contextualized time series data is configured for a contextualized time series model.

The one or more insights is, for example, data that provides context associated with the asset data 314 and/or the data (e.g., the contextualized time series data) stored in the contextualized time series database 318. In one or more embodiments, the one or more insights includes information related to trends, patterns and/or relationships between the asset data 314 and/or the data (e.g., the contextualized time series data) stored in the contextualized time series database 318. In one or more embodiments, the attributes for the asset data 314 and/or the data (e.g., the contextualized time series data) stored in the contextualized time series database 318 are associated with labels, classifications, insights, inferences, machine learning data and/or other attributes for the asset data 314 and/or the data (e.g., the contextualized time series data) stored in the contextualized time series database 318. In one or more embodiments, the asset insight component 306 employs a contextualized time series model (e.g., a machine learning model) that determines the one or more insights with respect to the asset data 314 and/or the data (e.g., the contextualized time series data) stored in the contextualized time series database 318. For example, in certain embodiments, the contextualized time series model identifies, classifies and/or predicts one or more context features associated with the asset data 314 and/or the data (e.g., the contextualized time series data) stored in the contextualized time series database 318. In an embodiment, the contextualized time series model is an extensible object model (e.g., a domain-intensive semantic object model). In one or more embodiments, the contextualized time series model is a deep neural network trained for time series context awareness. In one or more embodiments, the contextualized time series model employs fuzzy logic, a Bayesian network, a Markov logic network and/or another type of machine learning technique to determine the one or more insights.

In one or more embodiments, the asset insight component 306 determines one or more relationships between the attributes of the contextualized time series data. In one or more embodiments, the asset insight component 306 queries the contextualized time series model to correlate the attributes of the contextualized time series data. In one or more embodiments, the asset insight component 306 fetches metadata related to one or more assets from a metadata store. Furthermore, in one or more embodiments, the asset insight component 306 correlates the attributes of the contextualized time series data based on the metadata. Additionally or alternatively, in one or more embodiments, the asset insight component 306 formats the contextualized time series data based on the metadata. For example, in one or more embodiments, the asset insight component 306 determines dimensionality for the contextualized time series data based on the metadata.

In certain embodiments, the asset insight component 306 determines the one or more insights based on respective annotations and/or labels associated with the one or more assets. For example, in certain embodiments, the asset insight component 306 determines the one or more insights based on respective annotations and/or labels for asset properties, asset locations, asset sites, asset details, asset activities, asset functionalities, asset configurations, asset components, asset services, asset priorities and/or other asset information for the one or more assets.

Additionally, in one or more embodiments, the action component 308 performs one or more actions related to the one or more assets based on the one or more insights. For instance, in one or more embodiments, the action component 308 generates action data 322 associated with the one or more actions. In one or more embodiments, the action component 308 additionally employs a scoring model based on different metrics from historical iterations of the deep learning process and/or previous actions to determine the one or more actions. For example, in one or more embodiments, the scoring model employs weights for different metrics, different conditions, and/or different rules. An action from the one or more actions includes an API action, a dashboard visualization action, an asset controller action, a remote control operation, IoT a preventative maintenance action, a model update action, a machine learning action, an autonomous operation action, and/or another type of action.

In an embodiment, an action from the one or more actions includes generating a user-interactive electronic interface that renders a visual representation of the one or more insights. In one or more embodiment, in response to the request 320, the action component 308 generates dashboard visualization data associated with the one or more insights. For instance, in one or more embodiments, the action component 308 provides the dashboard visualization to an electronic interface of a computing device based on the dashboard visualization data. In one or more embodiments, the dashboard visualization data and/or the dashboard visualization associated with the dashboard visualization data includes the one or more insights. For example, in one or more embodiments, the dashboard visualization data and/or the dashboard visualization associated with the dashboard visualization data includes visualization data associated with the one or more insights. In one or more embodiments, the dashboard visualization data and/or the dashboard visualization associated with the dashboard visualization data includes real-time sensor data associated with the one or more insights. In one or more embodiments, the dashboard visualization data and/or the dashboard visualization associated with the dashboard visualization data includes a list of prioritized actions. In one or more embodiments, the dashboard visualization data and/or the dashboard visualization associated with the dashboard visualization data includes the grouping of prioritized actions for the one or more assets. In one or more embodiments, the dashboard visualization data and/or the dashboard visualization associated with the dashboard visualization data includes metrics associated with the one or more assets. In one or more embodiments, the action component 308 configures the dashboard visualization based on the user identifier, the event identifier, and/or the alarm identifier. In one or more embodiments, the action component 308 configures the dashboard visualization for remote control of asset settings for the one or more assets via the dashboard visualization.

In another embodiment, an action from the one or more actions includes transmitting, to a computing device, one or more notifications associated with the one or more insights. In another embodiment, an action from the one or more actions includes retraining one or more portions of the contextualized time series model based on the one or more insights. In another embodiment, an action from the one or more actions includes determining, based on the one or more insights, likelihood of success for a given operating scenario associated with the asset data 314. In another embodiment, an action from the one or more actions includes providing an optimal process condition for an asset associated with the asset data 314. For example, in another embodiment, an action from the one or more actions includes adjusting a set-point and/or a schedule for an asset associated with the asset data 314. In another embodiment, an action from the one or more actions includes one or more corrective action to take for an asset associated with the asset data 314. In another embodiment, an action from the one or more actions includes providing an optimal maintenance option for an asset associated with the asset data 314. In another embodiment, an action from the one or more actions includes predicting, based on the one or more insights, one or more conditions for the one or more assets. In another embodiment, the action component 308 performs the one or more actions based on metrics related to one or more historical interactions of the contextualized time series model associated with the contextualized time series data. In another embodiment, an action from the one or more actions includes an action associated with the application services layer 225, the applications layer 230, and/or the core services layer 235. In certain embodiments, the data aggregation component 304 updates one or more attributes based on a quality score associated with the one or more insights. Additionally or alternatively, in certain embodiments, the data aggregation component 304 updates one or more attributes based on user feedback data associated with the one or more insights.

Figure 4:
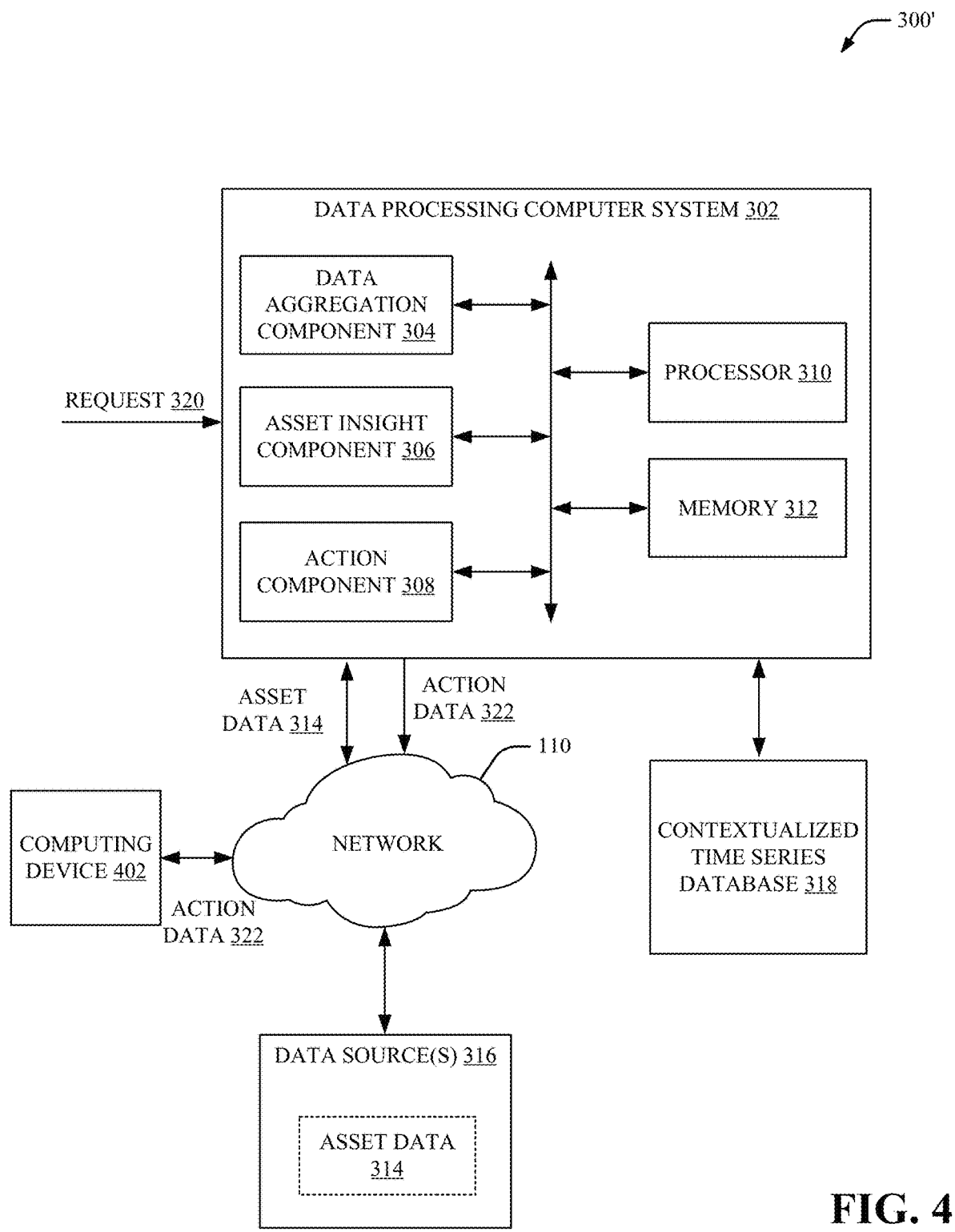
FIG. 4 illustrates another system that provides an exemplary environment associated with a data processing computer system, in accordance with one or more embodiments described herein.

FIG. 4 illustrates a system 300' that provides an exemplary environment according to one or more described features of one or more embodiments of the disclosure. In an embodiment, the system 300' corresponds to an alternate embodiment of the system 300 shown in FIG. 3. According to an embodiment, the system 300' includes the data processing computer system 302, the one or more data sources 316, the contextualized time series database 318 and/or a computing device 402. In one or more embodiments, the data processing computer system 302 is in communication with the one or more data sources 316 and/or the computing device 402 via the network 110. The computing device 402 is a mobile computing device, a smartphone, a tablet computer, a mobile computer, a desktop computer, a laptop computer, a workstation computer, a wearable device, a virtual reality device, an augmented reality device, or another type of computing device located remote from the data processing computer system 302.

In one or more embodiments, the action component 308 communicates the action data 322 to the computing device 402. For example, in one or more embodiments, the action data 322 includes one or more visual elements for a visual display (e.g., a user-interactive electronic interface) of the computing device 402 that renders a visual representation of the one or more insights. In certain embodiments, the visual display of the computing device 402 displays one or more graphical elements associated with the action data 322 (e.g., the one or more insights). In certain embodiments, the visual display of the computing device 402 provides a graphical user interface to facilitate managing data use associated with one or more assets associated with the asset data 314, costs associated with one or more assets associated with the asset data 314, asset planning associated with one or more assets associated with the asset data 314, asset services associated with one or more assets associated with the asset data 314, asset operations associated with one or more assets associated with the asset data 314, worker assist operations associated with one or more assets associated with the asset data 314, energy optimization operations associated with one or more assets associated with the asset data 314, asset performance operations associated with one or more assets associated with the asset data 314, asset health operations associated with one or more assets associated with the asset data 314, digitized maintenance operations associated with one or more assets associated with the asset data 314, and/or one or more other aspects of one or more assets associated with the asset data 314. In another example, in one or more embodiments, the action data 322 includes one or notifications associated with the one or more insights. In one or more embodiments, the action data 322 allows a user associated with the computing device 402 to make decisions and/or perform one or more actions with respect to the one or more insights.

Figure 5:
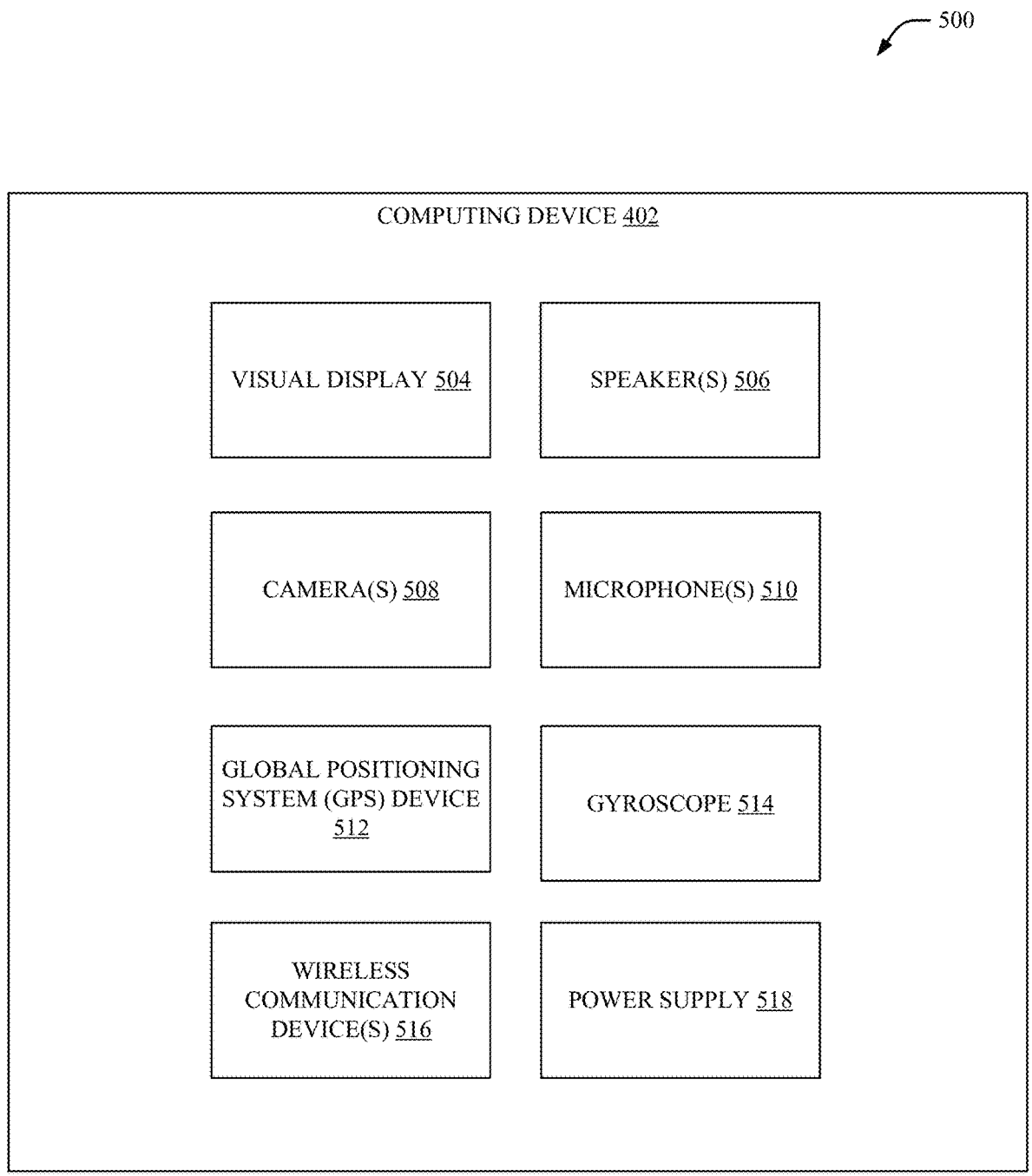
FIG. 5 illustrates an exemplary computing device, in accordance with one or more embodiments described herein.

FIG. 5 illustrates a system 500 according to one or more embodiments of the disclosure. The system 500 includes the computing device 402. In one or more embodiments, the computing device 402 employs mobile computing, augmented reality, cloud-based computing, IoT technology and/or one or more other technologies to provide video, audio, real-time data, graphical data, one or more communications one or more messages, one or more notifications, one or more documents, one or more work procedures, industrial asset tag details, and/or other media data associated with the one or more insights. The computing device 402 includes mechanical components, electrical components, hardware components and/or software components to facilitate obtaining one or more insights associated with the asset data 314. In the embodiment shown in FIG. 5, the computing device 402 includes a visual display 504, one or more speakers 506, one or more cameras 508, one or more microphones 510, a global positioning system (GPS) device 512, a gyroscope 514, one or more wireless communication devices 516, and/or a power supply 518.

In an embodiment, the visual display 504 is a display that facilitates presentation and/or interaction with one or more portions of the action data 322. In one or more embodiments, the computing device 402 displays an electronic interface (e.g., a graphical user interface) associated with a data analytics platform. In one or more embodiments, the visual display 504 is a visual display that renders one or more interactive media elements via a set of pixels. The one or more speakers 506 include one or more integrated speakers that project audio. The one or more cameras 508 include one or more cameras that employ autofocus and/or image stabilization for photo capture and/or real-time video. The one or more microphones 510 include one or more digital microphones that employ active noise cancellation to capture audio data. The GPS device 512 provides a geographic location for the computing device 402. The gyroscope 514 provides an orientation for the computing device 402. The one or more wireless communication devices 516 includes one or more hardware components to provide wireless communication via one or more wireless networking technologies and/or one or more short-wavelength wireless technologies. The power supply 518 is, for example, a power supply and/or a rechargeable battery that provides power to the visual display 504, the one or more speakers 506, the one or more cameras 508, the one or more microphones 510, the GPS device 512, the gyroscope 514, and/or the one or more wireless communication devices 516. In certain embodiments, data associated with the one or more insights is presented via the visual display 504 and/or the one or more speakers 506.

Figure 6:
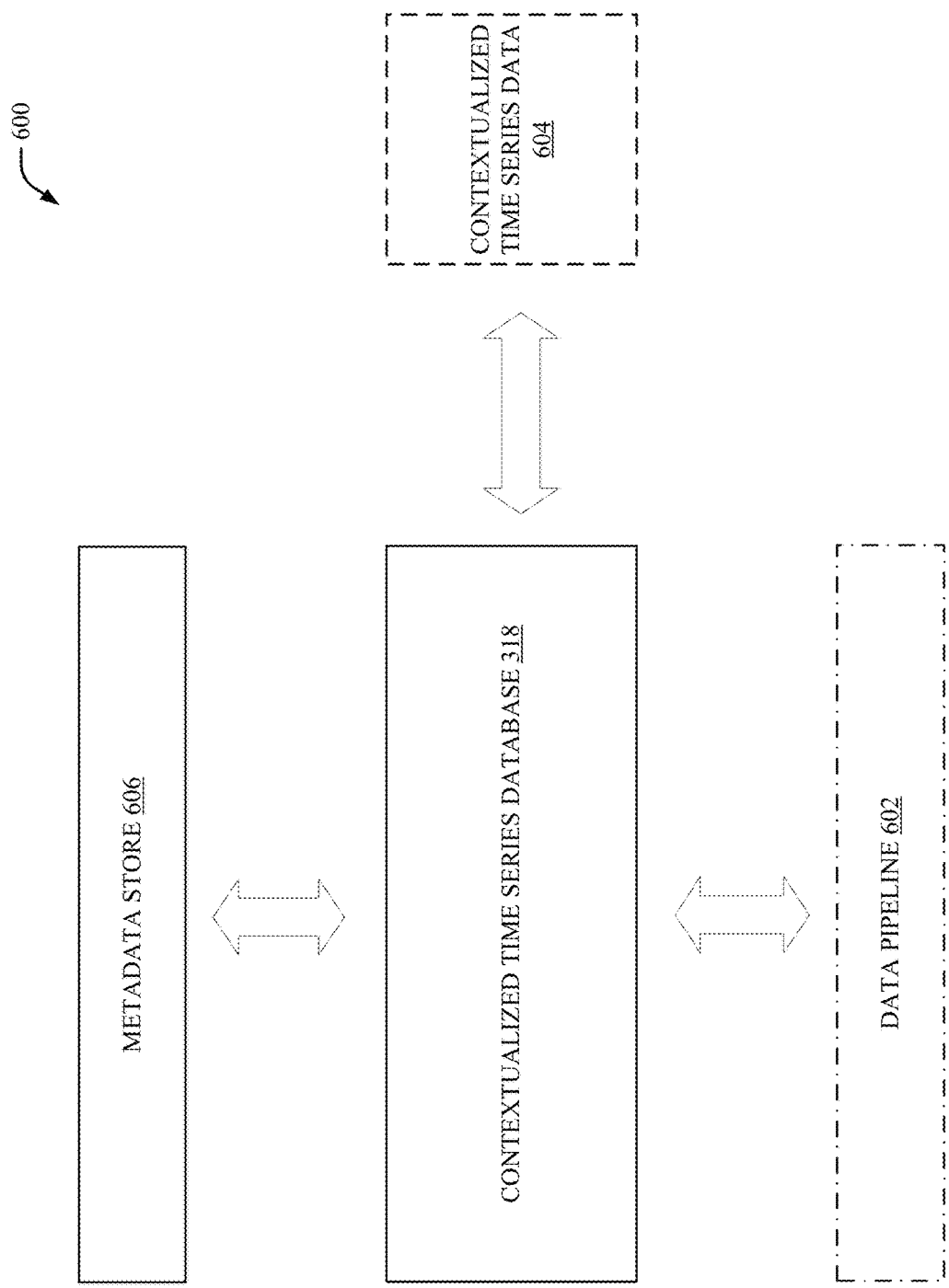
FIG. 6 illustrates an exemplary system associated with a contextualized time series database, in accordance with one or more embodiments described herein.

FIG. 6 illustrates a system 600 according to one or more described features of one or more embodiments of the disclosure. In an embodiment, the system 600 includes the contextualized time series database 318. In one or more embodiments, data from a data pipeline 602 is stored in the contextualized time series database 318 as contextualized time series data 604. For example, in one or more embodiments, the data pipeline 602 provides at least a portion of the asset data 314. In one or more embodiments, the data pipeline 602 is associated with the one or more data sources 316 and/or the network 110. In one or more embodiments, the data pipeline 602 is associated with incoming data provided by the one or more data sources 316 and/or the network 110. In one or more embodiments, data from a data pipeline 602 includes one or more data events and/or time-series data associated with the one or more data sources 316. Time-series data refers to a sequence of data indexed over an interval of time. For example, time-series data refers to a sequence of data that is ordered based on time. The contextualized time series data 604 is, for example, spatial contextual information for the data associated with the data pipeline 602. In one or more embodiments, data from a data pipeline 602 includes real-time sensor data for one or more assets, live property value data for one or more assets, other sensor data for one or more assets, event data for one or more assets, process data for one or more assets, operational data for one or more assets, fault data for one or more assets, and/or other data associated one or more assets. In one or more embodiments, the contextualized time series data 604 is data accessible by a user identifier based on a set of rules for the user identifier. In one or more embodiments, the system 600 additionally includes metadata store 606. In one or more embodiments, metadata related to one or more assets is fetched from the metadata store 606 to facilitate correlating attributes of the contextualized time series data 604 and/or to facilitate formatting one or more portions of the contextualized time series data 604. In one or more embodiments, the metadata includes functional metadata, spatial metadata, asset metadata, algorithm parameters, and/or other metadata.

In various embodiments, one or more data events associated with one or more assets can be correlated to one or more data objects for the event data. To obtain the one or more data objects for the event data, the data aggregation component 304 can monitor the data pipeline 602 to identify the one or more data events. Additionally, the event data can be transformed into one or more portions of the contextualized time series data 604 for storage in the contextualized time series database 318. In certain embodiments, the data aggregation component 304 can temporarily store one or more portions of the event data in one or more data queues associated with the data pipeline 602. The data aggregation component 304 can additionally or alternatively be configured to prepare the event data for storage in the contextualized time series database 318 by performing data filtering, data normalization, data enrichment, data aggregation, data consolidation, and/or one or more other event preparation processes with respect to the event data. In certain embodiments, the data aggregation component 304 can perform data filtering, data normalization, data enrichment, data aggregation, data consolidation, and/or one or more other event preparation processes with respect to the event data based on event attributes and/or asset attributes such as, but not limited to, an asset identifier, an asset name, asset state, asset location, asset type, alarm identifier, alarm name, alarm state, etc. Additionally or alternatively, the data aggregation component 304 can perform data filtering, data normalization, data enrichment, data aggregation, data consolidation, and/or one or more other event preparation processes with respect to the event data based on event rules and/or asset rules defined for various event attributes and/or asset attributes. In certain embodiments, events can be aggregated based on a number of a certain type of events over a certain period of time and/or based on multiple events occurring. In various embodiments, attributes related to event data can include, but is not limited to, alarm faulty severity, event status, a start time for an event, an end time for an event, a fault name, an event description, fault history related to an event, asset information related to an event, a fault mode, and/or one or more other attributes.

In various embodiments, the data aggregation component 304 can allocate the event data into discrete event data stores based on associative relationships with one or more alarms for one or more assets. For example, the data aggregation component 304 can allocate the event data into discrete event data stores based on an alarm identifier, an alarm name, and/or an alarm state associated with an event. In various embodiments, an event can be identified based on a change to an alarm state for an asset. In various embodiments, data provided to a dashboard visualization and/or user interface can be based on event data stored in the discrete event data stores.

In various embodiments, the asset insight component 306 can employ the event data stored in the contextualized time series database 318 to perform event modeling associated with a set of patterns, a set of rules, and/or a data mapping schema. In various embodiments, an event model can be trained to identify an event based on a set of patterns, a set of rules, and/or a data mapping schema. For example, an event model can be trained to classify certain types of event data as a certain type of asset event. Additionally or alternatively, the asset insight component 306 can employ the event data stored in the contextualized time series database 318 to perform an event reaction process that provides assessment, routing, and/or predictions related to the event data. The event data can also be further consumed via a dashboard, an application, and/or another type of visual representation to facilitate analysis of the event data such as analytics, rankings, event tracking, classification, etc. for events.

Figure 7:
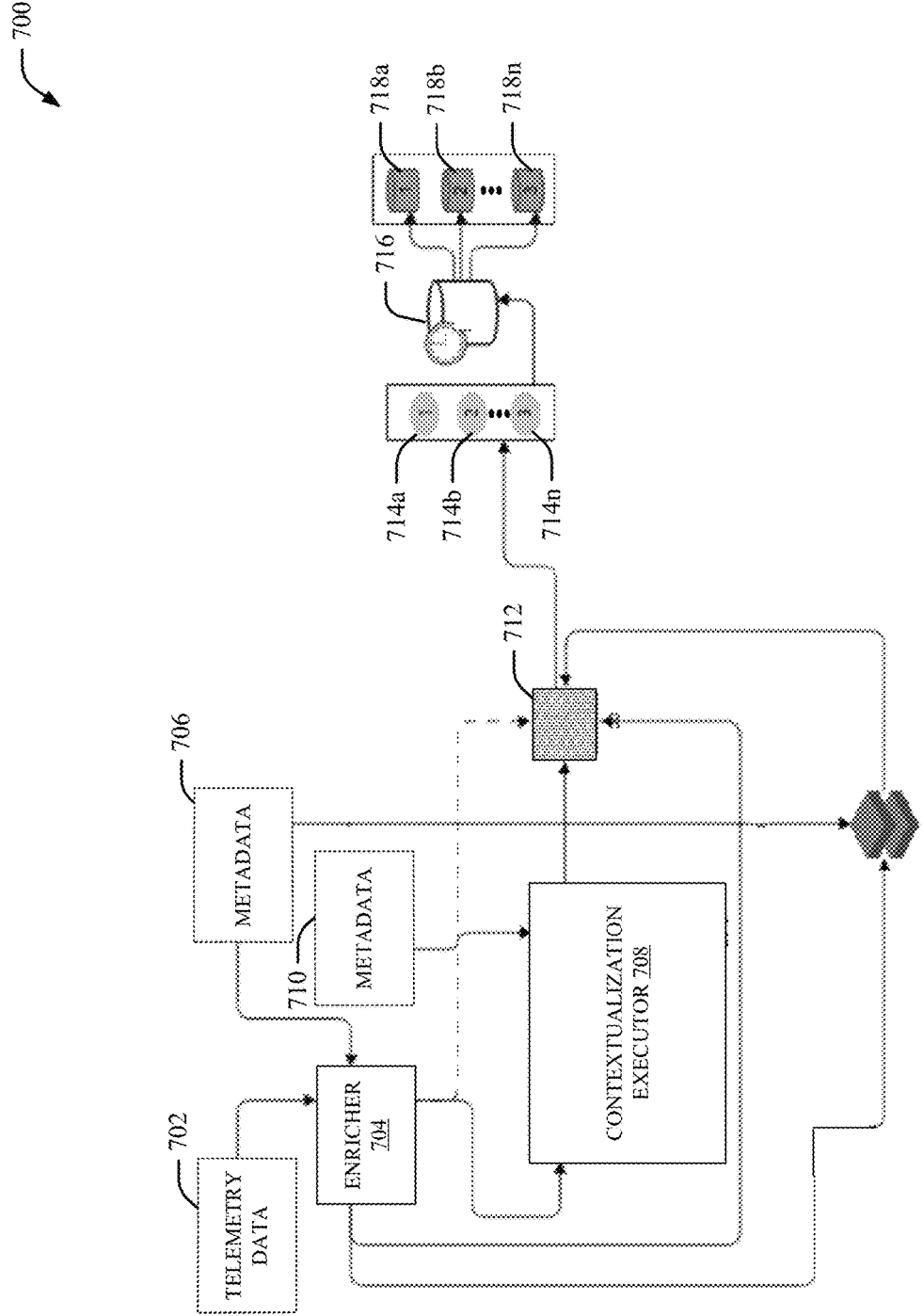
FIG. 7 illustrates an exemplary system for data enrichment and/or contextualization, in accordance with one or more embodiments described herein.

FIG. 7 illustrates a system 700 for data enrichment and/or contextualization according to one or more described features of one or more embodiments of the disclosure. In an embodiment, the system 700 provides data enrichment and/or contextualization of data using metadata related to a functional role of a user, spatial dimensionality information for data, asset information, and/or algorithm parameters for a contextualization technique with respect to storage of data in a contextualized time series database. In one or more embodiments, the system 700 includes functionality performed by the data aggregation component 304. In one or more embodiments, telemetry data 702 is provided to an enricher 704. The telemetry data 702 is, for example, raw telemetry data provided by one or more assets. In one or more embodiments, the telemetry data 702 is configured as time series data related to the one or more assets. The enricher 704 is, for example, a data enricher configured to enrich the telemetry data 702 for storage in a contextualized time series database. In one or more embodiments, the enricher 704 employs metadata 706 to facilitate enrichment of the telemetry data 702. The metadata 706 is, for example, metadata related to a functional role of a user, spatial dimensionality information for data, and/or asset information related to the one or more assets. In one or more embodiments, an enriched version of the telemetry data 702 is provided to contextualization executor 708. The contextualization executor 708 is configured to contextualize the telemetry data 702 to, for example, provide contextualized telemetry data. In one or more embodiments, the contextualization executor 708 is configured to contextualize the telemetry data 702 based on metadata 710. The metadata 710 is, for example, metadata related to algorithm parameters for a contextualization technique executed by the contextualization executor 708. Based on the contextualized telemetry data and/or the enriched version of the telemetry data 702, real-time data ingestion 712 is configured to determine and/or process one or more events related to the telemetry data 702. In one or more embodiments, the one or more events corresponds to one or more events associated with a particular user identifier. Additionally or alternatively, respective events correspond to respective attributes and/or features for the telemetry data 702.

In an embodiment, the respective attributes include one or more data field attributes for a format structure of a contextualized time series database. For example, in an embodiment, the respective attributes include one or more column name attributes for the format structure. Additionally or alternatively, in an embodiment, the respective attributes include one or more column value attributes for the format structure. However, it is to be appreciated that the respective attributes can additionally or alternatively include one or more other types of attributes associated with the format structure. In certain embodiments, the respective attributes include one or more text embeddings for column names associated with the format structure. For example, in certain embodiments, the respective attributes include one or more text embeddings for column names associated with a source column name and/or a target column name for one or more portions of the contextualized time series database. Additionally or alternatively, in certain embodiments, the respective attributes include one or more text embeddings for column values associated with the format structure. In one or more embodiments, an attribute includes a timestamp attribute, an item name attribute, a value attribute, a system attribute, a quality attribute, an asset identifier (e.g., an asset name), an assembly line identifier, a packaging line identifier, a location attribute, a building identifier (e.g., a building name), a plant identifier (e.g., an industrial plant name, a processing plant name, etc.), a unit of measure attribute, a user attribute, a role attribute, a site attribute, and/or another type of attribute.

In one or more embodiments, the system 700 includes one or more filters 714a-n. The one or more filters 714a-n can be configured to filter data per user identifier to provide respective contextualized time series data for respective user identifiers to a contextualized time series database 716. For example, in one or more embodiments, the one or more filters 714a-n are configured as respective data dimensionality filters associated with a user identifier. In one or more embodiments, the one or more filters 714a-n are configured based on respective dimensionality information such as, for example, columns, rows, and/or properties associated with a format structure. In one or more embodiments, the contextualized time series database 716 corresponds to the contextualized time series database 318. In one or more embodiments, the contextualized time series database 716 includes respective datastores 718a-n for the respective user identifiers to allocate the respective contextualized time series data for the respective user identifiers within the respective datastores 718a-n. In certain embodiments, the respective datastores 718a-n can be additionally or alternatively configured for a respective event and/or a respective alarm associated with one or more assets to allocate the respective contextualized time series data for the respective event and/or the respective alarm. For example, the one or more filters 714a-n can be additionally or alternatively configured to filter data per event identifier and/or per alarm identifier.

Figure 8:
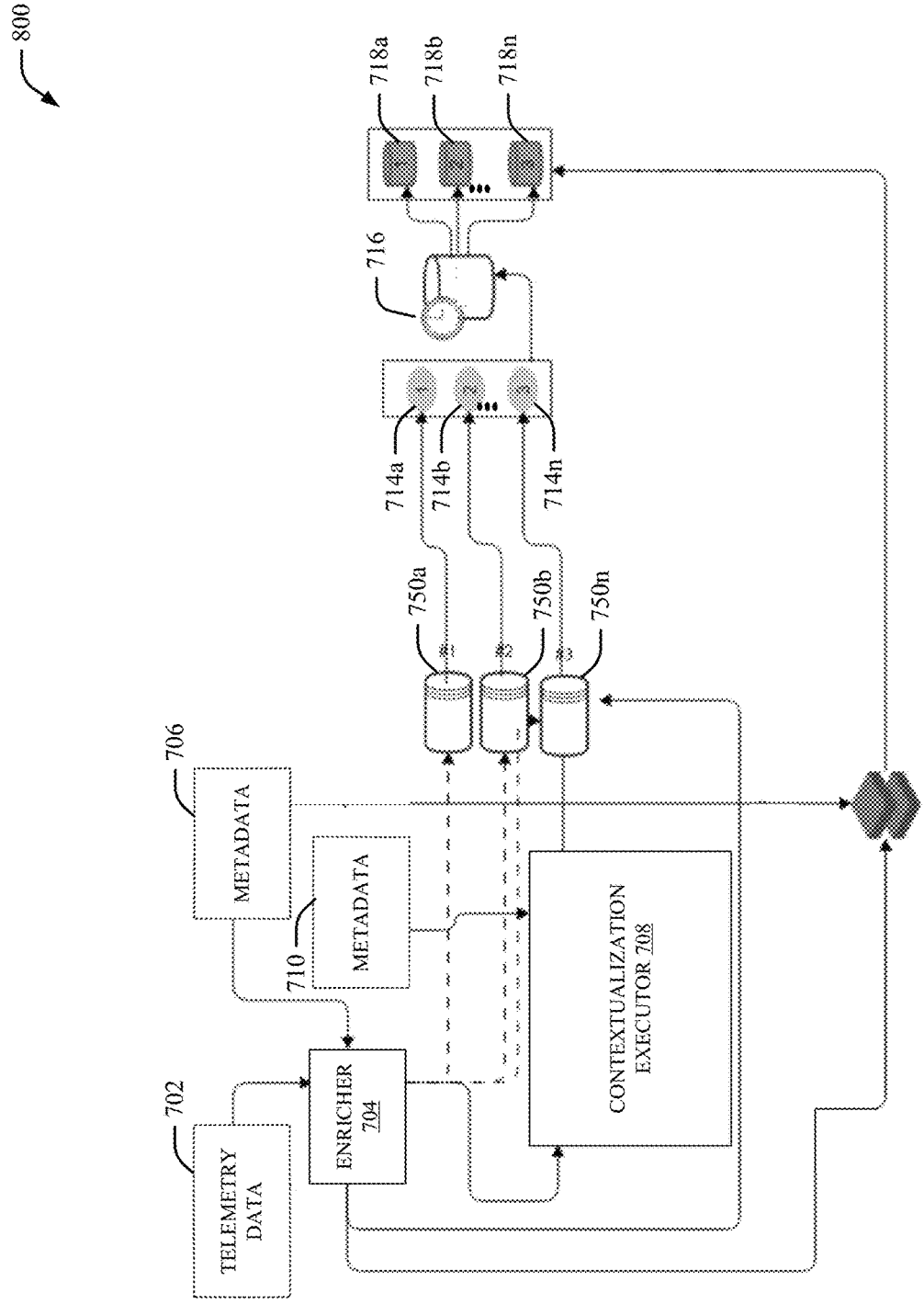
FIG. 8 illustrates another exemplary system for data enrichment and/or contextualization, in accordance with one or more embodiments described herein.

FIG. 8 illustrates a system 800 for data enrichment and/or contextualization according to one or more described features of one or more embodiments of the disclosure. In an embodiment, the system 800 provides data enrichment and/or contextualization of data using metadata related to a functional role of a user, spatial dimensionality information for data, asset information, and/or algorithm parameters for a contextualization technique with respect to storage of data in a contextualized time series database. In one or more embodiments, the system 800 includes functionality performed by the data aggregation component 304. In one or more embodiments, the telemetry data 702 is provided to the enricher 704. In one or more embodiments, the enricher 704 employs the metadata 706 to facilitate enrichment of the telemetry data 702. In one or more embodiments, an enriched version of the telemetry data 702 is provided to the contextualization executor 708. In one or more embodiments, the contextualization executor 708 is configured to contextualize the telemetry data 702 based on metadata 710. Based on the contextualized telemetry data and/or the enriched version of the telemetry data 702, one or more distributed event processing pipelines 750a-n are configured to determine and/or process one or more events related to the telemetry data 702. In certain embodiments, the one or more distributed event processing pipelines 750a-n employ one or more compression techniques and/or one or more batching techniques to determine and/or process one or more events related to the telemetry data 702. In one or more embodiments, respective distributed event processing pipelines 750a-n are configured for respective attributes and/or features for the telemetry data 702. Additionally or alternatively, in one or more embodiments, respective distributed event processing pipelines 750a-n are configured for respective user identifiers. The respective one or more distributed event processing pipelines 750a-n are processed by the respective one or more filters 714a-n. The one or more filters 714a-n can be configured to filter data per user identifier to provide respective contextualized time series data for respective user identifiers to a contextualized time series database 716. In one or more embodiments, the contextualized time series database 716 includes respective datastores 718*a-n* for the respective user identifiers to allocate the respective contextualized time series data for the respective user identifiers within the respective datastores 718*a-n*.

Figure 9:
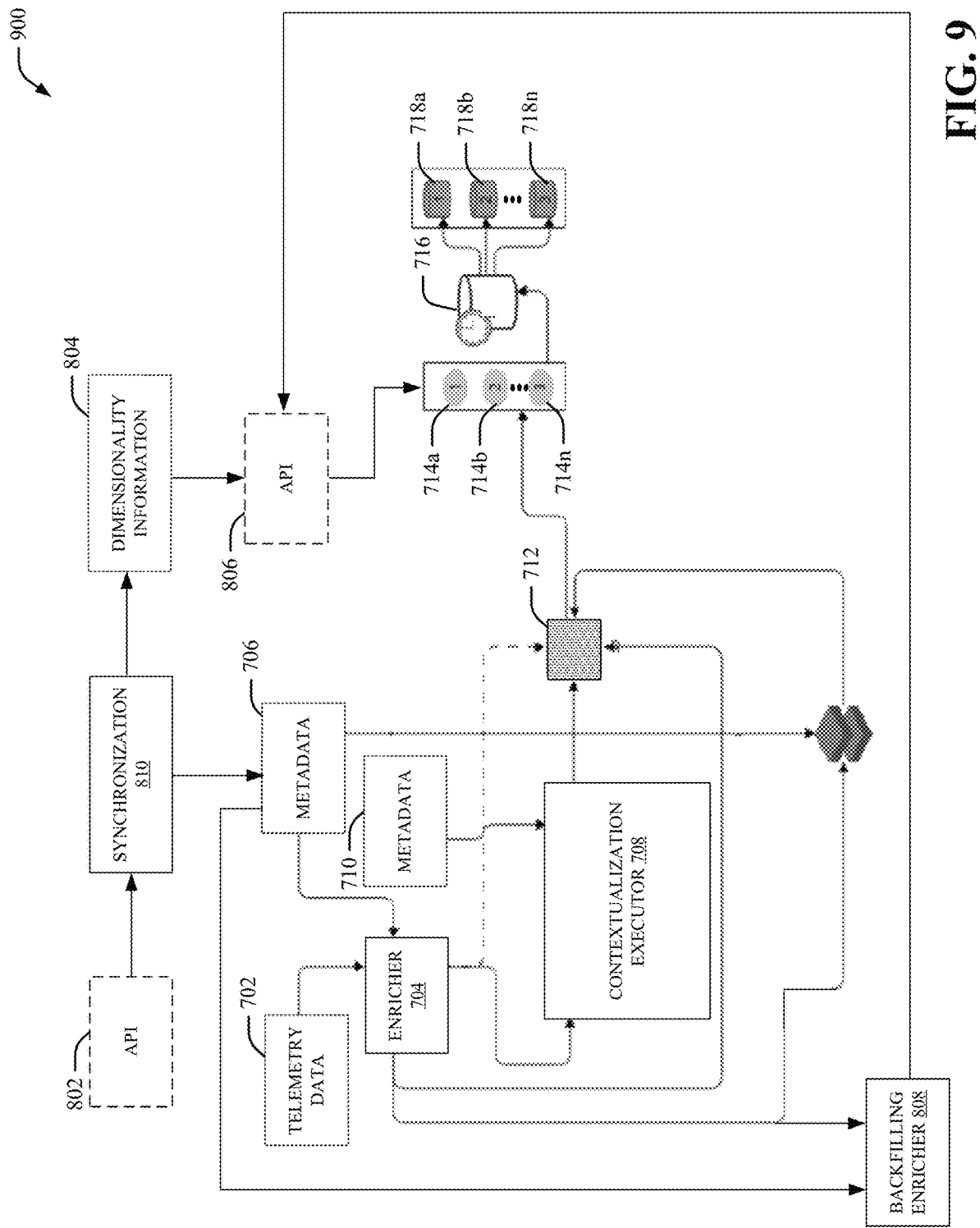
FIG. 9 illustrates another exemplary system for data enrichment and/or contextualization, in accordance with one or more embodiments described herein.

FIG. 9 illustrates a system 900 for data enrichment and/or contextualization according to one or more described features of one or more embodiments of the disclosure. In an embodiment, the system 900 includes the enricher 704, the contextualization executor 708, the real-time data ingestion 712, the one or more filters 714*a-n*, the contextualized time series database 716, and/or the respective datastores 718*a-n*. In one or more embodiments, the system 900 configures the metadata 706 and/or the one or more filters 714*a-n* based on a request (e.g., the request 320) triggered via an API 802. In one or more embodiments, dimensionality information 804 for respective user identifiers, respective event identifier, and/or respective alarm identifiers is provided to the one or more filters 714*a-n* via an API 806. In one or more embodiments, the dimensionality information 804 includes one or more dimensions for the one or more filters 714*a-n*. In one or more embodiments the dimensionality information 804 includes column information, row information, and/or properties associated with a format structure for the respective datastores 718*a-n* to facilitate configuration of the one or more filters 714*a-n*. Additionally, in one or more embodiments, a backfilling enricher 808 is configured to further enrich the telemetry data 702 in response to a change associated with a user identifier, an event identifier, an alarm identifier, the metadata 706, and/or other portions of the system 900. For example, in one or more embodiments, the backfilling enricher 808 determines new telemetry data for the telemetry data 702 based on a change associated with a user identifier, an event identifier, an alarm identifier, the metadata 706, and/or other portions of the system 900. In one or more embodiments, a backfilling enricher 808 is configured to update dimensionality of data, metadata, and/or a filter. Additionally, in one or more embodiments, synchronization 810 is configured to fetch one or more portions of the metadata 706 in response to configuration of the API 802. For example, in one or more embodiments, the synchronization 810 is configured to synchronize fetching of one or more portions of the metadata 706 based on the request (e.g., the request 320) triggered via the API 802. In one or more embodiments, the API 802 is related to an API command request.

Figure 10:
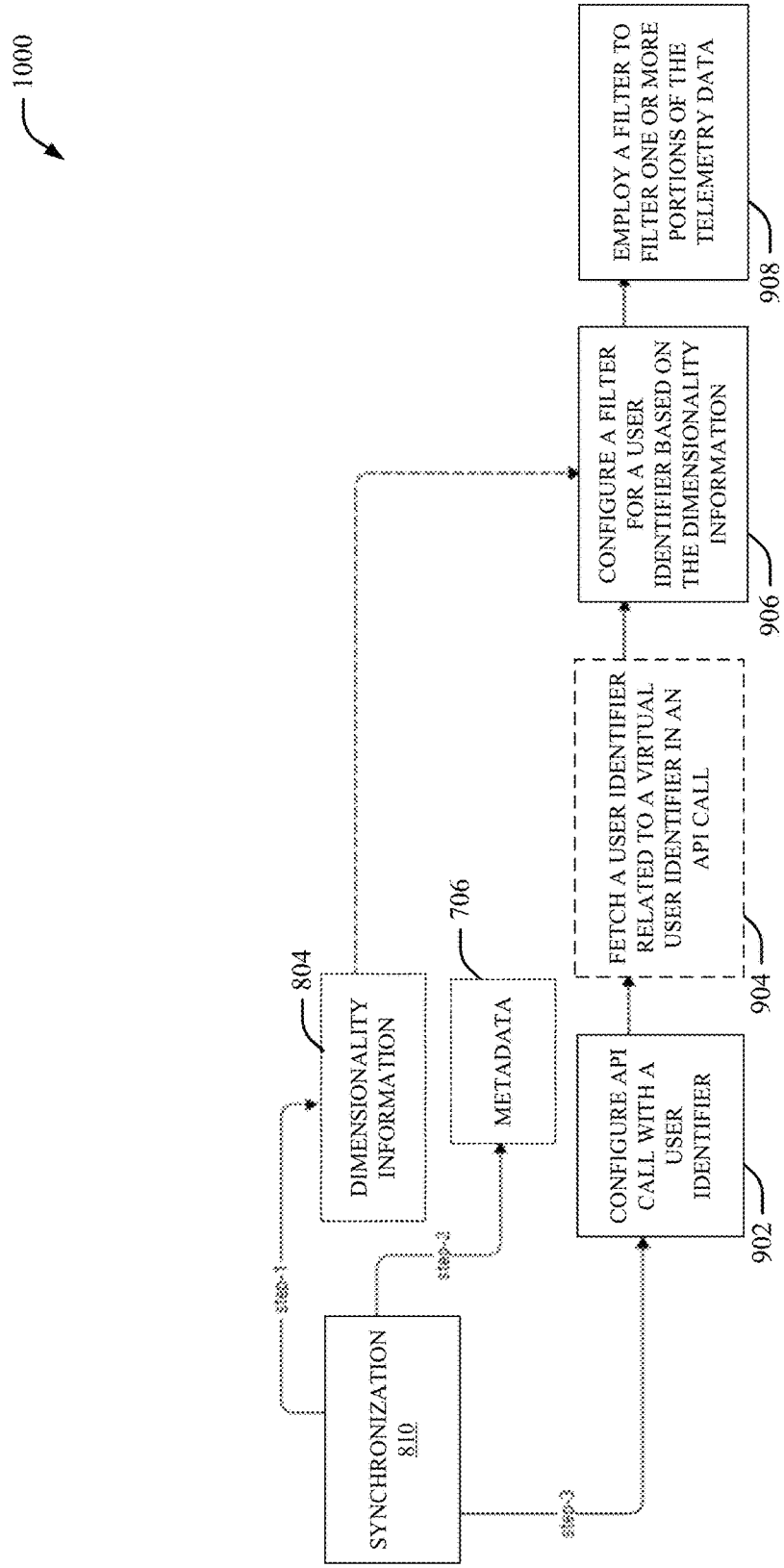
FIG. 10 illustrates an exemplary system related to synchronization, in accordance with one or more embodiments described herein.

FIG. 10 illustrates a system 1000 related to synchronization according to one or more described features of one or more embodiments of the disclosure. In an embodiment, the system 1000 includes the synchronization 810 configured to fetch one or more portions of the metadata 706 based on the dimensionality information 804. In one or more embodiments, the synchronization 810 determines dimensionality associated with previous processing of telemetry data and compares the dimensionality with dimensionality of the telemetry data 702. If dimensionality of the previous telemetry data and the telemetry data 702 match, the synchronization 810 maintains dimensionality for the telemetry data 702 and/or the metadata 706. For example, if column information, row information, and/or properties associated with the previous telemetry data and the telemetry data 702 match, the synchronization 810 maintains dimensionality for the telemetry data 702 and/or the metadata 706. However, if dimensionality of the previous telemetry data and the telemetry data 702 do not match, the synchronization 810 updates one or more portions of the dimensionality information 804. For example, if column information, row information, and/or properties associated with the previous telemetry data and the telemetry data 702 do not match, the synchronization 810 updates one or more portions of the dimensionality information 804. In one or more embodiments, an API call is configured with a user identifier (step 902) and/or an API fetches a user identifier related to a virtual user identifier in an API call (step 904). In one or more embodiments, a filter is configured for a user identifier based on the dimensionality information 804 (step 906). In one or more embodiments, a filter is employed to filter one or more portions of the telemetry data 702 (step 908).

Figure 11:
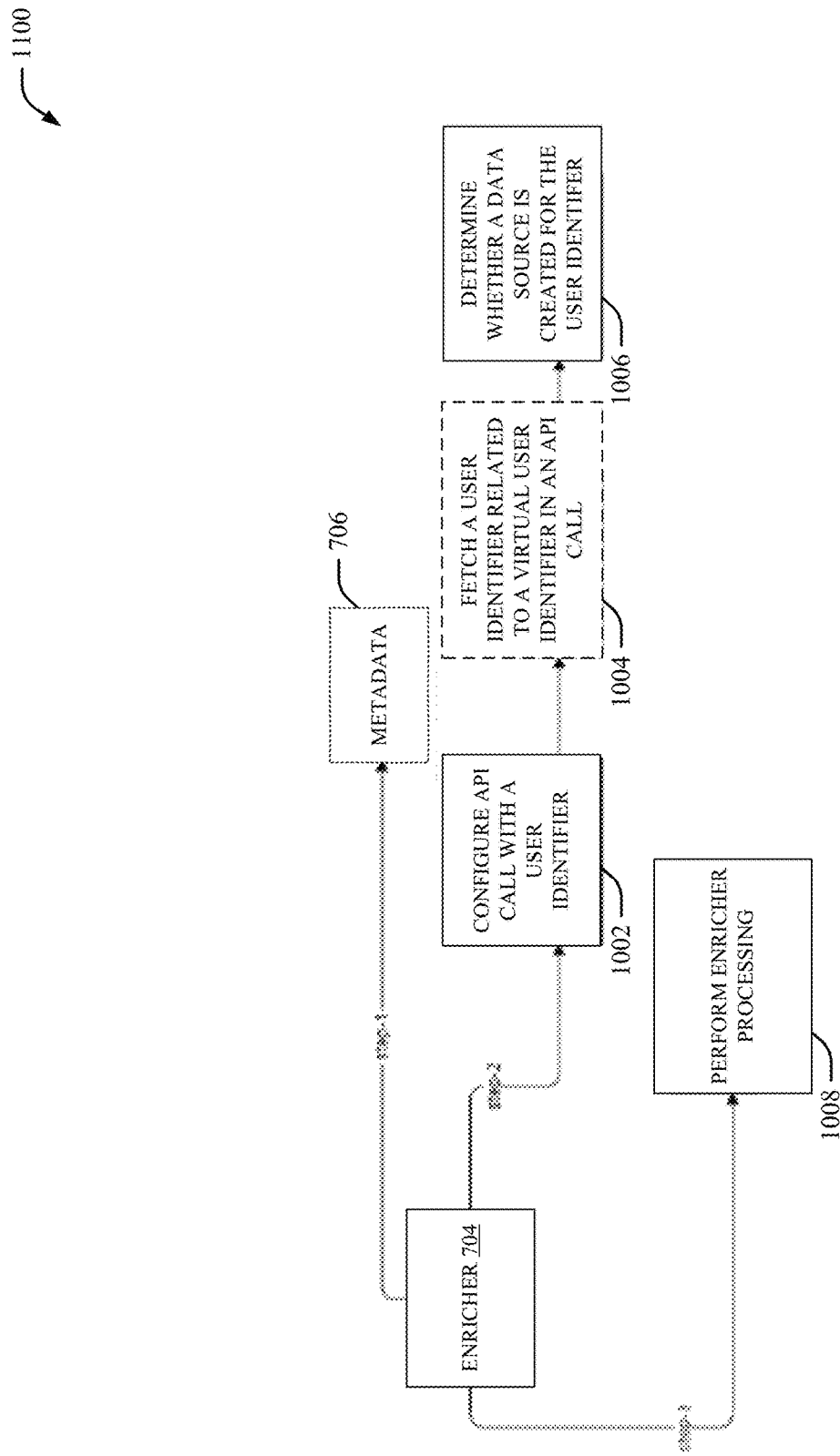
FIG. 11 illustrates an exemplary system related to data enrichment, in accordance with one or more embodiments described herein.

FIG. 11 illustrates a system 1100 related to data enrichment according to one or more described features of one or more embodiments of the disclosure. In an embodiment, the system 1100 includes the enricher 704 configured to enrich telemetry data based on the metadata 706. In one or more embodiments, the enricher 704 determines whether the metadata 706 includes respective metadata for an enrichment process performed by the enricher 704. For example, in one or more embodiments, the enricher 704 compares metadata for telemetry data to the metadata 706. In one or more embodiments, an API call is configured with a user identifier (step 1002) and/or an API fetches a user identifier related to a virtual user identifier in an API call (step 1004). In one or more embodiments, it is determined whether a data source is created for the user identifier (step 1006). In one or more embodiments, the enricher 704 performs enricher processing (step 1008). For example, in one or more embodiments, the enricher 704 performs enricher processing based on the metadata 706. In one or more embodiments, the enricher 704 is a data enricher configured to enrich telemetry data for storage in a contextualized time series database. In one or more embodiments, the enricher 704 employs the metadata 706 to facilitate enrichment of the telemetry data.

Figure 12:
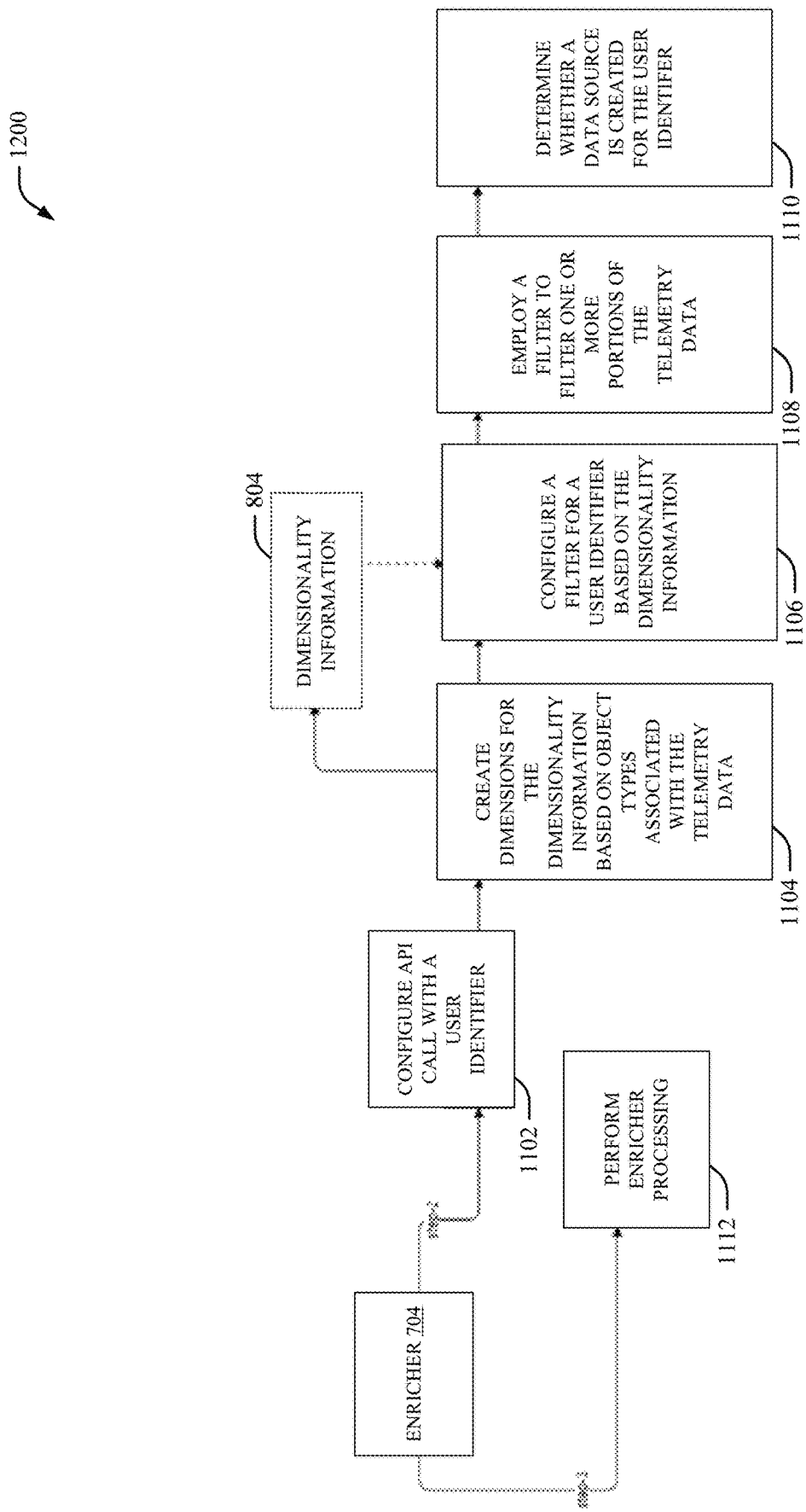
FIG. 12 illustrates an exemplary system related to raw ingestion of telemetry data, in accordance with one or more embodiments described herein.

FIG. 12 illustrates a system 1200 related to raw ingestion of telemetry data according to one or more described features of one or more embodiments of the disclosure. In an embodiment, the system 1200 includes the enricher 704 configured to enrich telemetry data. In one or more embodiments, an API call is configured with a user identifier (step 1102). In one or more embodiments, dimensions for the dimensionality information 804 are created based on object types associated with the telemetry data (step 1104). For example, in one or more embodiments, a schema for telemetry data is converted into dimensions to be included in the dimensionality information 804. In one or more embodiments, a filter is configured for a user identifier based on the dimensionality information 804 (step 1106). In one or more embodiments, a filter is employed to filter one or more portions of the telemetry data 702 (step 1108). In one or more embodiments, it is determined whether a data source is available for the user identifier (step 1110). In one or more embodiments, the enricher 704 performs enricher processing (step 1112). For example, in one or more embodiments, the enricher 704 employs the metadata 706 to facilitate enrichment of the telemetry data 702. In one or more embodiments, the enricher 704 generates new telemetry data based on a functional role of a user, spatial dimensionality information for data, spatial dimensionality information for a contextualized time series database, and/or asset information related to one or more assets.

Figure 13:
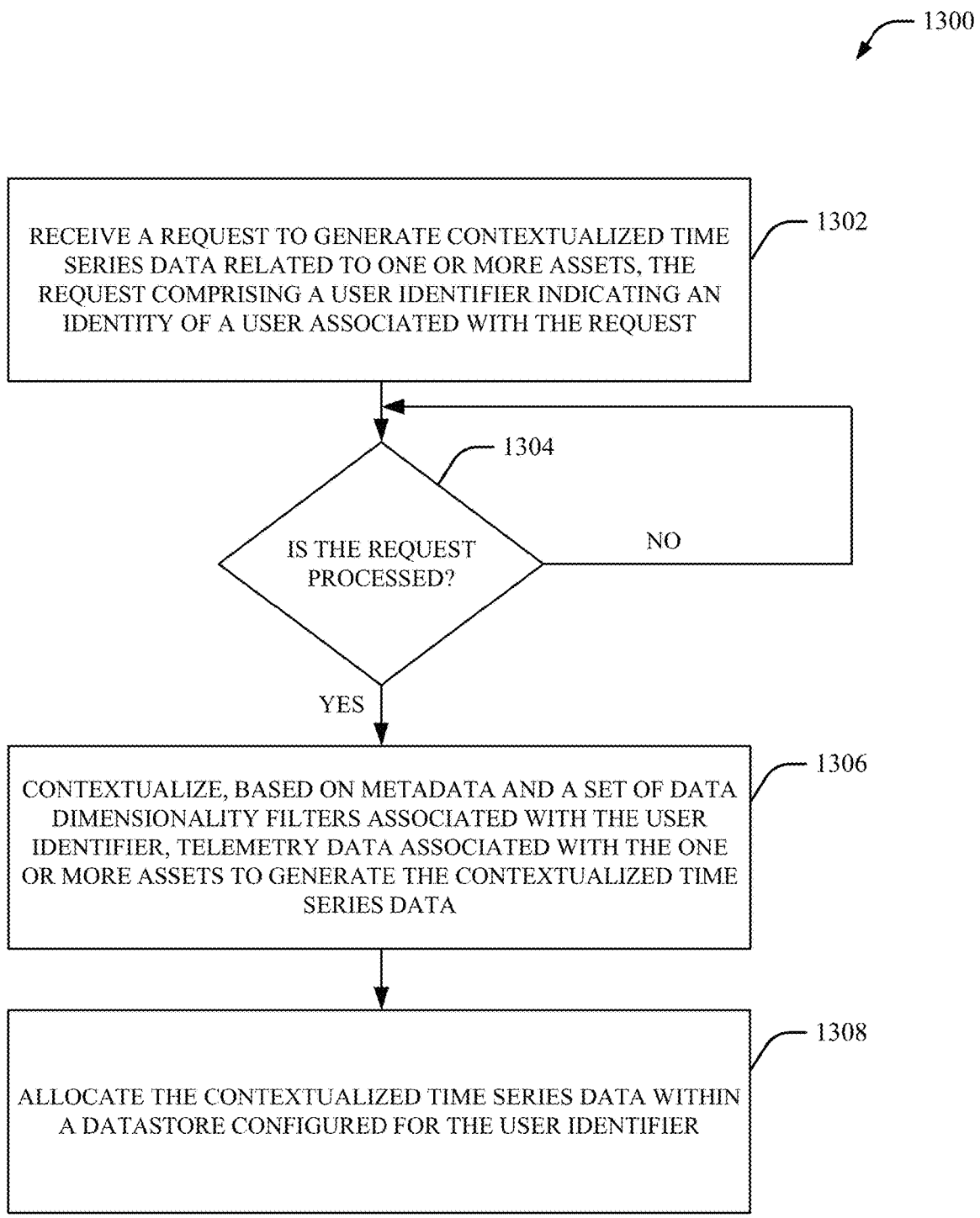
FIG. 13 illustrates a flow diagram for configuring a contextualized time series database, in accordance with one or more embodiments described herein.

FIG. 13 illustrates a method 1300 for configuring a contextualized time series database, in accordance with one or more embodiments described herein. The method 1300 is associated with the data processing computer system 302, for example. For instance, in one or more embodiments, the method 1300 is executed at a device (e.g. the data processing computer system 302) with one or more processors and a memory. In one or more embodiments, the method 1300 facilitates a contextualized time series database for providing asset insights. In one or more embodiments, the method 1300 begins at block 1302 that receives (e.g., by the data aggregation component 304) a request to generate contextualized time series data related to one or more assets, the request comprising a user identifier indicating an identity of a user associated with the request. In one or more embodiments, the request is an API command request. The request to generate the contextualized time series data provides one or more technical improvements such as, but not limited to, facilitating interaction with a computing device and/or extended functionality for a computing device.

At block 1304, it is determined whether the request is processed. If no, block 1304 is repeated to determine whether the request is processed. If yes, the method 1300 proceeds to block 1306. In response to the request, block 1206 contextualizes (e.g., by the data aggregation component 304) telemetry data associated with the one or more assets, based on metadata and a set of data dimensionality filters associated with the user identifier, to generate the contextualized time series data. The contextualizing provides one or more technical improvements such as, but not limited to, extended functionality for a computing device and/or improving accuracy of the one or more asset insights.

In one or more embodiments, the contextualizing includes parsing the telemetry data based on metadata associated with dimensionality for the set of data dimensionality filters. In one or more embodiments, the contextualizing additionally or alternatively includes parsing the telemetry data based on event data associated with the one or more assets. In one or more embodiments, the contextualizing additionally or alternatively includes parsing the telemetry data based on alarm data associated with the one or more assets. In one or more embodiments, the contextualizing additionally or alternatively includes formatting the contextualized time series data based on the user identifier. In one or more embodiments, the contextualizing additionally or alternatively includes filtering the contextualized time series data based on the set of data dimensionality filters.

In response to the request, the method 1300 also includes a block 1308 that allocates (e.g., by the data aggregation component 304) the contextualized time series data within a datastore configured for the user identifier an event identifier, and/or an alarm identifier. The allocating provides one or more technical improvements such as, but not limited to, extended functionality for a computing device, improving accuracy of the one or more asset insights, and/or a varied experience for a computing device. In one or more embodiments, the method 1300 further includes obtaining one or more insights with respect to the contextualized time series data allocated within the datastore.

In one or more embodiments, the allocating includes organizing the contextualized time series data based on an ontological tree structure that captures relationships among different portions of the contextualized time series data.

In one or more embodiments, the method 1300 additionally or alternatively includes allocating the contextualized time series data within a datastore configured for the user identifier. In one or more embodiments, the method 1300 additionally or alternatively includes obtaining one or more insights with respect to the contextualized time series data allocated within the datastore associated with the user identifier. In one or more embodiments, the method 1300 additionally or alternatively includes rendering a visual representation of the one or more insights via the user-interactive electronic interface. In one or more embodiments, the method 1300 additionally or alternatively includes.

In one or more embodiments, the method 1300 additionally or alternatively includes processing the telemetry data related to the one or more assets to determine data related to the one or more assets. In one or more embodiments, the method 1300 additionally or alternatively includes generating attributes for the one or more assets based on one or more classifications with respect to the data related to the one or more assets.

Figure 14:
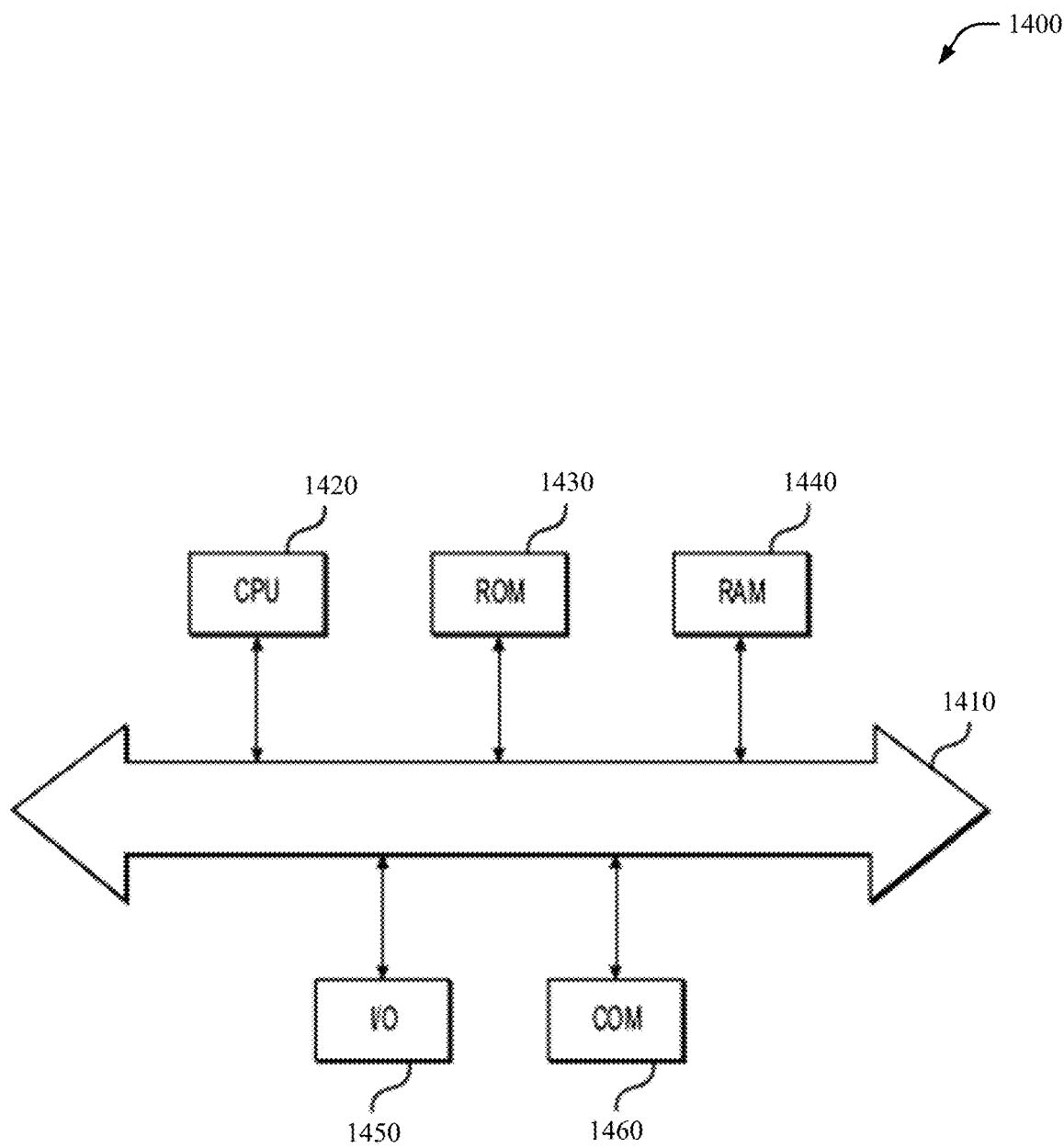
FIG. 14 illustrates a functional block diagram of a computer that may be configured to execute techniques described in accordance with one or more embodiments described herein.

FIG. 14 depicts an example system 1400 that may execute techniques presented herein. FIG. 14 is a simplified functional block diagram of a computer that may be configured to execute techniques described herein, according to exemplary embodiments of the present disclosure. Specifically, the computer (or "platform" as it may not be a single physical computer infrastructure) may include a data communication interface 1460 for packet data communication. The platform also may include a central processing unit ("CPU") 1420, in the form of one or more processors, for executing program instructions. The platform may include an internal communication bus 1410, and the platform also may include a program storage and/or a data storage for various data files to be processed and/or communicated by the platform such as ROM 1430 and RAM 1440, although the system 1400 may receive programming and data via network communications. The system 1400 also may include input and output ports 1450 to connect with input and output devices such as keyboards, mice, touchscreens, monitors, displays, etc. Of course, the various system functions may be implemented in a distributed fashion on a number of similar platforms, to distribute the processing load. Alternatively, the systems may be implemented by appropriate programming of one computer hardware platform.

The general discussion of this disclosure provides a brief, general description of a suitable computing environment in which the present disclosure may be implemented. In one embodiment, any of the disclosed systems, methods, and/or graphical user interfaces may be executed by or implemented by a computing system consistent with or similar to that depicted and/or explained in this disclosure. Although not required, aspects of the present disclosure are described in the context of computer-executable instructions, such as routines executed by a data processing device, e.g., a server computer, wireless device, and/or personal computer. Those skilled in the relevant art will appreciate that aspects of the present disclosure can be practiced with other communications, data processing, or computer system configurations, including: Internet appliances, hand-held devices (including personal digital assistants ("PDAs")), wearable computers, all manner of cellular or mobile phones (including Voice over IP ("VoIP") phones), dumb terminals, media players, gaming devices, virtual reality devices, multi-processor systems, microprocessor-based or programmable consumer electronics, set-top boxes, network PCs, mini-computers, mainframe computers, and the like. Indeed, the terms "computer," "server," and the like, are generally used interchangeably herein, and refer to any of the above devices and systems, as well as any data processor.

Aspects of the present disclosure may be embodied in a special purpose computer and/or data processor that is specifically programmed, configured, and/or constructed to perform one or more of the computer-executable instructions explained in detail herein. While aspects of the present disclosure, such as certain functions, are described as being performed exclusively on a single device, the present disclosure also may be practiced in distributed environments where functions or modules are shared among disparate processing devices, which are linked through a communications network, such as a Local Area Network ("LAN"), Wide Area Network ("WAN"), and/or the Internet. Similarly, techniques presented herein as involving multiple devices may be implemented in a single device. In a distributed computing environment, program modules may be located in both local and/or remote memory storage devices.

Aspects of the present disclosure may be stored and/or distributed on non-transitory computer-readable media, including magnetically or optically readable computer discs, hard-wired or preprogrammed chips (e.g., EEPROM semiconductor chips), nanotechnology memory, biological memory, or other data storage media. Alternatively, computer implemented instructions, data structures, screen displays, and other data under aspects of the present disclosure may be distributed over the Internet and/or over other networks (including wireless networks), on a propagated signal on a propagation medium (e.g., an electromagnetic wave(s), a sound wave, etc.) over a period of time, and/or they may be provided on any analog or digital network (packet switched, circuit switched, or other scheme).

Program aspects of the technology may be thought of as "products" or "articles of manufacture" typically in the form of executable code and/or associated data that is carried on or embodied in a type of machine-readable medium. "Storage" type media include any or all of the tangible memory of the computers, processors or the like, or associated modules thereof, such as various semiconductor memories, tape drives, disk drives and the like, which may provide non-transitory storage at any time for the software programming. All or portions of the software may at times be communicated through the Internet or various other telecommunication networks. Such communications, for example, may enable loading of the software from one computer or processor into another, for example, from a management server or host computer of the mobile communication network into the computer platform of a server and/or from a server to the mobile device. Thus, another type of media that may bear the software elements includes optical, electrical and electromagnetic waves, such as used across physical interfaces between local devices, through wired and optical landline networks and over various airlinks. The physical elements that carry such waves, such as wired or wireless links, optical links, or the like, also may be considered as media bearing the software. As used herein, unless restricted to non-transitory, tangible "storage" media, terms such as computer or machine "readable medium" refer to any medium that participates in providing instructions to a processor for execution.

In some example embodiments, certain ones of the operations herein can be modified or further amplified as described below. Moreover, in some embodiments additional optional operations can also be included. It should be appreciated that each of the modifications, optional additions or amplifications described herein can be included with the operations herein either alone or in combination with any others among the features described herein.

The foregoing method descriptions and the process flow diagrams are provided merely as illustrative examples and are not intended to require or imply that the steps of the various embodiments must be performed in the order presented. As will be appreciated by one of skill in the art the order of steps in the foregoing embodiments can be performed in any order. Words such as "thereafter," "then," "next," etc. are not intended to limit the order of the steps; these words are simply used to guide the reader through the description of the methods. Further, any reference to claim elements in the singular, for example, using the articles "a," "an" or "the" is not to be construed as limiting the element to the singular.

It is to be appreciated that 'one or more' includes a function being performed by one element, a function being performed by more than one element, e.g., in a distributed fashion, several functions being performed by one element, several functions being performed by several elements, or any combination of the above.

Moreover, it will also be understood that, although the terms first, second, etc. are, in some instances, used herein to describe various elements, these elements should not be limited by these terms. These terms are only used to distinguish one element from another. For example, a first contact could be termed a second contact, and, similarly, a second contact could be termed a first contact, without departing from the scope of the various described embodiments. The first contact and the second contact are both contacts, but they are not the same contact.

The terminology used in the description of the various described embodiments herein is for the purpose of describing particular embodiments only and is not intended to be limiting. As used in the description of the various described embodiments and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" is, optionally, construed to mean "when" or "upon" or "in response to determining" or "in response to detecting," depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]," depending on the context.

The systems, apparatuses, devices, and methods disclosed herein are described in detail by way of examples and with reference to the figures. The examples discussed herein are examples only and are provided to assist in the explanation of the apparatuses, devices, systems, and methods described herein. None of the features or components shown in the drawings or discussed below should be taken as mandatory for any specific implementation of any of these the apparatuses, devices, systems or methods unless specifically designated as mandatory. For ease of reading and clarity, certain components, modules, or methods may be described solely in connection with a specific figure. In this disclosure, any identification of specific techniques, arrangements, etc. are either related to a specific example presented or are merely a general description of such a technique, arrangement, etc. Identifications of specific details or examples are not intended to be, and should not be, construed as mandatory or limiting unless specifically designated as such. Any failure to specifically describe a combination or sub-combination of components should not be understood as an indication that any combination or sub-combination is not possible. It will be appreciated that modifications to disclosed and described examples, arrangements, configurations, components, elements, apparatuses, devices, systems, methods, etc. can be made and may be desired for a specific application. Also, for any methods described, regardless of whether the method is described in conjunction with a flow diagram, it should be understood that unless otherwise specified or required by context, any explicit or implicit ordering of steps performed in the execution of a method does not imply that those steps must be performed in the order presented but instead may be performed in a different order or in parallel.

Throughout this disclosure, references to components or modules generally refer to items that logically can be grouped together to perform a function or group of related functions. Like reference numerals are generally intended to refer to the same or similar components. Components and modules can be implemented in software, hardware, or a combination of software and hardware. The term "software" is used expansively to include not only executable code, for example machine-executable or machine-interpretable instructions, but also data structures, data stores and computing instructions stored in any suitable electronic format, including firmware, and embedded software. The terms "information" and "data" are used expansively and includes a wide variety of electronic information, including executable code; content such as text, video data, and audio data, among others; and various codes or flags. The terms "information," "data," and "content" are sometimes used interchangeably when permitted by context.

The hardware used to implement the various illustrative logics, logical blocks, modules, and circuits described in connection with the aspects disclosed herein can include a general purpose processor, a digital signal processor (DSP), a special-purpose processor such as an application specific integrated circuit (ASIC) or a field programmable gate array (FPGA), a programmable logic device, discrete gate or transistor logic, discrete hardware components, or any combination thereof designed to perform the functions described herein. A general-purpose processor can be a microprocessor, but, in the alternative, the processor can be any processor, controller, microcontroller, or state machine. A processor can also be implemented as a combination of computing devices, e.g., a combination of a DSP and a microprocessor, a plurality of microprocessors, one or more microprocessors in conjunction with a DSP core, or any other such configuration. Alternatively, or in addition, some steps or methods can be performed by circuitry that is specific to a given function.

In one or more example embodiments, the functions described herein can be implemented by special-purpose hardware or a combination of hardware programmed by firmware or other software. In implementations relying on firmware or other software, the functions can be performed as a result of execution of one or more instructions stored on one or more non-transitory computer-readable media and/or one or more non-transitory processor-readable media. These instructions can be embodied by one or more processor-executable software modules that reside on the one or more non-transitory computer-readable or processor-readable storage media. Non-transitory computer-readable or processor-readable storage media can in this regard comprise any storage media that can be accessed by a computer or a processor. By way of example but not limitation, such non-transitory computer-readable or processor-readable media can include random access memory (RAM), read-only memory (ROM), electrically erasable programmable read-only memory (EEPROM), FLASH memory, disk storage, magnetic storage devices, or the like. Disk storage, as used herein, includes compact disc (CD), laser disc, optical disc, digital versatile disc (DVD), floppy disk, and Blu-ray Disc™, or other storage devices that store data magnetically or optically with lasers. Combinations of the above types of media are also included within the scope of the terms non-transitory computer-readable and processor-readable media. Additionally, any combination of instructions stored on the one or more non-transitory processor-readable or computer-readable media can be referred to herein as a computer program product.

Many modifications and other embodiments of the inventions set forth herein will come to mind to one skilled in the art to which these inventions pertain having the benefit of teachings presented in the foregoing descriptions and the associated drawings. Although the figures only show certain components of the apparatus and systems described herein, it is understood that various other components can be used in conjunction with the supply management system. Therefore, it is to be understood that the inventions are not to be limited to the specific embodiments disclosed and that modifications and other embodiments are intended to be included within the scope of the appended claims. Moreover, the steps in the method described above can not necessarily occur in the order depicted in the accompanying diagrams, and in some cases one or more of the steps depicted can occur substantially simultaneously, or additional steps can be involved. Although specific terms are employed herein, they are used in a generic and descriptive sense only and not for purposes of limitation.

It is intended that the specification and examples be considered as exemplary only, with a true scope and spirit of the disclosure being indicated by the following claims.

What is claimed is:

1. A system, comprising:
one or more processors;
a memory; and
one or more programs stored in the memory, the one or more programs comprising instructions configured to:
receive, via a user-interactive electronic interface, an application programming interface (API) command request to generate contextualized time series data related to one or more assets, the API command request comprising a user identifier indicating an identity of a user associated with the API command request; and
in response to the API command request:
determine whether telemetry data associated with the one or more assets is enriched with metadata;
enrich the telemetry data with functional metadata, spatial metadata, asset metadata, and algorithm parameters based on the determination that the telemetry data is not enriched with the metadata, wherein the metadata includes functional metadata, spatial metadata, asset metadata, and algorithm parameters related to contextualization of the telemetry data;
contextualize, based on (i) the metadata related to the one or more assets and (ii) a set of data dimensionality filters configured based on respective dimensionality information associated with a format structure for a datastore configured for the user identifier, the enriched telemetry data associated with the one or more assets to generate the contextualized time series data;

allocate the contextualized time series data within the datastore configured for the user identifier;

obtain one or more insights with respect to the contextualized time series data allocated within the datastore associated with the user identifier; and render a visual representation of the one or more insights via the user-interactive electronic interface.

2. The system of claim 1, wherein the metadata is first metadata, and the one or more programs further comprising instructions configured to:

parse the telemetry data based on second metadata associated with dimensionality for the set of data dimensionality filters.

3. The system of claim 1, the one or more programs further comprising instructions configured to:

parse the telemetry data based on event data associated with the one or more assets.

4. The system of claim 1, the one or more programs further comprising instructions configured to:

parse the telemetry data based on alarm data associated with the one or more assets.

5. The system of claim 1, the one or more programs further comprising instructions configured to:

format the contextualized time series data based on the user identifier.

6. The system of claim 1, the one or more programs further comprising instructions configured to:

filter the contextualized time series data based on the set of data dimensionality filters.

7. The system of claim 1, the one or more programs further comprising instructions configured to:

organize the contextualized time series data based on an ontological tree structure that captures relationships among different portions of the contextualized time series data.

8. The system of claim 1, the one or more programs further comprising instructions configured to:

process the telemetry data related to the one or more assets to determine data related to the one or more assets; and generate attributes for the one or more assets based on one or more classifications with respect to the data related to the one or more assets.

9. The system of claim 1, the one or more programs further comprising instructions configured to perform a specific type of operation corresponding to the contextualized time series data based on header data.

10. A method, comprising:

at a device with one or more processors and a memory:

receiving, via a user-interactive electronic interface, an application programming interface (API) command request to generate contextualized time series data related to one or more assets, the API command request comprising a user identifier indicating an identity of a user associated with the API command request; and in response to the API command request:

determining whether telemetry data associated with the one or more assets is enriched with metadata;

enriching the telemetry data with functional metadata, spatial metadata, asset metadata, and algorithm parameters based on the determination that the telemetry data is not enriched with the metadata, wherein the metadata includes functional metadata, spatial metadata, asset metadata, and algorithm parameters related to contextualization of the telemetry data;

contextualizing, based on (i) the metadata related to the one or more assets and (ii) a set of data dimensionality filters configured based on respective dimensionality information associated with a format structure for a datastore configured for the user identifier, the enriched telemetry data associated with the one or more assets to generate the contextualized time series data;

allocating the contextualized time series data within the datastore configured for the user identifier;

obtaining one or more insights with respect to the contextualized time series data allocated within the datastore associated with the user identifier; and rendering a visual representation of the one or more insights via the user-interactive electronic interface.

11. The method of claim 10, wherein the metadata is first metadata, and the contextualizing comprising parsing the telemetry data based on second metadata associated with dimensionality for the set of data dimensionality filters.

12. The method of claim 10, the contextualizing comprising parsing the telemetry data based on event data associated with the one or more assets.

13. The method of claim 10, the contextualizing comprising parsing the telemetry data based on alarm data associated with the one or more assets.

14. The method of claim 10, the contextualizing comprising formatting the contextualized time series data based on the user identifier.

15. The method of claim 10, the contextualizing comprising filtering the contextualized time series data based on the set of data dimensionality filters.

16. The method of claim 10, the allocating the contextualized time series data comprising organizing the contextualized time series data based on an ontological tree structure that captures relationships among different portions of the contextualized time series data.

17. The method of claim 10, further comprising:

processing the telemetry data related to the one or more assets to determine data related to the one or more assets; and generating attributes for the one or more assets based on one or more classifications with respect to the data related to the one or more assets.

18. A computer program product comprising at least one computer-readable storage medium having program instructions embodied thereon, the program instructions executable by a processor to cause the processor to:

receive, via a user-interactive electronic interface, an application programming interface (API) command request to generate contextualized time series data related to one or more assets, the API command request comprising a user identifier indicating an identity of a user associated with the API command request; and in response to the API command request:

determine whether telemetry data associated with the one or more assets is enriched with metadata;

enrich the telemetry data with functional metadata, spatial metadata, asset metadata, and algorithm parameters based on the determination that the telemetry data is not enriched with the metadata, wherein the metadata includes functional metadata, spatial metadata, asset metadata, and algorithm parameters related to contextualization of the telemetry data;

contextualize, based on (i) the metadata related to the one or more assets and (ii) a set of data dimensionality filters configured based on respective dimensionality information associated with a format structure for a datastore configured for the user identifier, the enriched telemetry data associated with the one or more assets to generate the contextualized time series data;

allocate the contextualized time series data within the datastore configured for the user identifier;

obtain one or more insights with respect to the contextualized time series data allocated within the datastore associated with the user identifier; and render a visual representation of the one or more insights via the user-interactive electronic interface.

19. The computer program product of claim 18, wherein the metadata is first metadata, and the program instructions further executable by the processor to cause the processor to:
parse the telemetry data based on second metadata associated with dimensionality for the set of data dimensionality filters.

20. The computer program product of claim 18, the program instructions further executable by the processor to cause the processor to:
parse the telemetry data based on event data associated with the one or more assets.

21. The computer program product of claim 18, the program instructions further executable by the processor to cause the processor to:
parse the telemetry data based on alarm data associated with the one or more assets.

* * * * *